(12) United States Patent
Hafez et al.

(10) Patent No.: US 6,513,065 B1
(45) Date of Patent: Jan. 28, 2003

(54) ENTERPRISE MANAGEMENT SYSTEM AND METHOD WHICH INCLUDES SUMMARIZATION HAVING A PLURALITY OF LEVELS OF VARYING GRANULARITY

(75) Inventors: Amr Hafez, Boxborough, MA (US); Joseph Rocco, Everett, MA (US); Subhash Agrawal, Houston, TX (US)

(73) Assignee: BMC Software, Inc., Houston, TX (US)

( * ) Notice: Subject to any disclaimer, the term of this patent is extended or adjusted under 35 U.S.C. 154(b) by 0 days.

(21) Appl. No.: 09/262,194

(22) Filed: Mar. 4, 1999

(51) Int. Cl.[7] .............................................. G06F 15/173
(52) U.S. Cl. ........................ 709/224; 709/223; 709/202; 709/101; 709/200; 709/203; 709/500.1
(58) Field of Search ................................. 709/202, 224, 709/223, 203, 231, 331, 204; 707/101, 7, 8, 200, 203, 500.1; 370/252, 253; 345/134, 328

(56) References Cited

U.S. PATENT DOCUMENTS

| | | | | |
|---|---|---|---|---|
| 5,757,357 A | * | 5/1998 | Grande et al. ............... | 345/134 |
| 5,867,483 A | * | 2/1999 | Ennis, Jr. et al. ........... | 370/252 |
| 5,995,095 A | * | 11/1999 | Ratakonda ................... | 345/328 |
| 6,128,628 A | * | 10/2000 | Waclawski et al. .......... | 707/203 |
| 6,141,699 A | * | 10/2000 | Luzzi et al. ................. | 709/331 |
| 6,148,335 A | * | 11/2000 | Haggard et al. ............. | 709/224 |
| 6,263,337 B1 | * | 7/2001 | Fayyad et al. ................ | 707/6 |

* cited by examiner

Primary Examiner—Ayaz Sheikh
Assistant Examiner—Oanh Duong
(74) Attorney, Agent, or Firm—Wong, Cabello, Lutsch, Rutherford & Brucculeri, P.C.

(57) ABSTRACT

A system and method for summarizing metric data with a plurality of levels of varying granularity. The system preferably comprises a distributed computing environment, i.e., an enterprise, which comprises a plurality of interconnected computer systems. At least one of the computer systems is an agent computer system which collects raw data relating to one or more metrics, i.e., measurements of system resources on the agent computer system. A Universal Data Repository (UDR) receives raw metric data from one or more agents. The UDR summarizes the raw data into a more compact yet meaningful form. The UDR can summarize both raw data and data that has previously been summarized one or more times, thus creating a plurality of levels of summarization. With each successive summarization, metric data become more compact, yet the data retain information and meaning. Each level of summarization is coarser in granularity and typically older than the previous level: the metric data representing a given period of time become more summarized and take up less space. So that the record of a particular process is never totally lost, process state changes are preserved throughout. The UDR preferably stores each level of summarization in a different file. When a file fills up to its configured maximum size, the oldest metric data from that file are summarized and pushed into the next coarsest file. When the coarsest file fills up, the oldest metric data from the coarsest file are deleted.

51 Claims, 17 Drawing Sheets

UDR Data Summarization

ENTERPRISE MANAGEMENT SYSTEM AND METHOD WHICH INCLUDES SUMMARIZATION HAVING A PLURALITY OF LEVELS OF VARYING GRANULARITY

CROSS-REFERENCE TO RELATED APPLICATIONS

The following are related applications to the present application.

U.S. patent application Ser. No. 09/262,229 titled "Enterprise Management System and Method Which Includes Semantically Correct Summarization" and filed Mar. 4, 1999.

BACKGROUND OF THE INVENTION

1. Field of the Invention

The present invention relates to the collection, analysis, and management of system resource data in distributed or enterprise computer systems, and particularly to a system and method for reducing file sizes in an intelligent way.

2. Description of the Related Art

The data processing resources of business organizations are increasingly taking the form of a distributed computing environment in which data and processing are dispersed over a network comprising many interconnected, heterogeneous, geographically remote computers. Such a computing environment is commonly referred to as an enterprise computing environment, or simply an enterprise. Managers of the enterprise often employ software packages known as enterprise management systems to monitor, analyze, and manage the resources of the enterprise. Enterprise management systems may provide for the collection of measurements, or metrics, concerning the resources of individual systems. For example, an enterprise management system might include a software agent on an individual computer system for the monitoring of particular resources such as CPU usage or disk access. The enterprise management agent might periodically collect metric data and write to a "data spill" containing historical metric data, i.e., metric data previously collected over a period of time. U.S. Pat. No. 5,655,081 discloses one example of an enterprise management system.

Historical data spills can be useful in a number of circumstances. First, even where an enterprise management system permits real-time monitoring of metric data, the enterprise is not always monitored for twenty-four hours a day, seven days a week. Thus, historical data spills provide a way to review metric data that was not monitored in real time. Second, regardless of whether metrics are monitored in real time, an enterprise manager may desire to review the history of one or more metrics which preceded a problem in another, related metric. Third, historical data spills can be used for analysis of the enterprise. For example, an analysis of the most frequent clients of a particular file server in the enterprise would utilize historical metric data. For these reasons, enterprise managers desire to keep track of as much historical metric data as possible. However, storage space and other resources are finite and not without cost. Therefore, the enterprise manager faces a trade-off between using costly storage resources on the one hand and throwing away meaningful metric data on the other hand. The object, then, is to reduce the amount of data stored while throwing out as little meaningful data as possible.

The prior art has produced a variety of compression techniques for reducing file size. Some compression methods are "lossless": they compress data by looking for patterns and redundancies, losing no information in the process. File-level and disk-level compression techniques for computer systems are lossless methods. Unfortunately, lossless methods typically achieve low compression rates, and so their usefulness is limited, especially for large, relatively patternless spills of metric data. Other compression methods are "lossy": they typically achieve higher compression rates than lossless methods, but they lose information in the process. For example, techniques for compressing video and image data commonly eliminate pixel-to-pixel variances in color that are barely noticeable to the human eye. In other words, those methods determine the least necessary data by comparing pixels to one another, and then the methods discard that data. However, techniques for compressing metric data cannot so rely on the deficiencies of human perception. Often, compression techniques of the prior art compress metric data by decimating it: in other words, by simply throwing away every Nth element of a data spill, or by keeping every Nth element of a data spill. Decimation methods thus use a "brute force" approach with the result that the meaningful and the meaningless alike are discarded. The methods of the prior art employ a "one size fits all" methodology: they treat all bits and bytes the same, no matter what meaning those bits and bytes may hold. The methods do not look beyond the mere logical ones and zeroes to appreciate the significance of the data. Therefore, both the lossless and the lossy compression methods of the prior art are inadequate to solve the enterprise manager's dilemma.

For the foregoing reasons, there is a need for a system and method for reducing file sizes in an intelligent way.

SUMMARY OF THE INVENTION

The present invention is directed to a system and method that solve the need for intelligent summarization of data. Preferably, the present invention provides improved management of collected metric data through summarization of data according to the semantics or meaning of the underlying data types, and also through summarization of data at a plurality of levels of varying granularity. In a preferred embodiment, the system and method are used in a distributed computing environment, i.e., an enterprise. The enterprise comprises a plurality of computer systems, or nodes, which are interconnected through a network. At least one of the computer systems is a monitor computer system from which a user may monitor the nodes of the enterprise. At least one of the computer systems is an agent computer system. An agent computer system includes agent software that permits the collection of data relating to one or more metrics, i.e., measurements of system resources on the agent computer system.

In a preferred embodiment, a Universal Data Repository (UDR) receives a set of data points from one or more agent computer systems. The set of data points is a series of metrics, i.e., measurements of one or more system resources, which have been gathered by data collectors on the agent computer systems over a period of time. The UDR preferably summarizes the set of data points into a more compact yet meaningful form. In summarization according to one embodiment, the UDR determines a data type of the set of data points, applies a summarization rule according to the data type, and then creates a summarized data structure which corresponds to the set of data points. The UDR may summarize multiple sets of data points in succession.

In one embodiment, the summarization rule varies according to the semantics, i.e., the meaning, of the data type. For example, if the data type of the collected metric data is a counter, i.e., a measurement that can only go up, then the summarized data structure will comprise the starting value, ending value, and total number of data points. On the other hand, if the data type of the collected metric data is a gauge, i.e., a measurement that can go up or down, then the summarized data structure will comprise the average of all the data points and the total number of data points. If the data type of the collected metric data is a clock, i.e., a measurement of elapsed time, then the summarized data structure will comprise the starting value, the ending value, and the frequency of the clock. If the data type of the metric data is a string, i.e., a series of characters which can be manipulated as a group, then the summarized data structure will comprise the first string. By applying different summarization rules keyed to different data types, the system and method preserve costly storage resources by taking the most meaningful information and putting it into smaller packages.

To decrease file size even further, in one embodiment the system and method also provide for multiple levels of summarization: as new metric data is received, previously received data is summarized into coarser data structures, wherein the degree of coarseness corresponds to the age of the data. After the metric data has been collected by an agent, the UDR summarizes raw data points into summarized data structures. Each summarized data structure corresponds to two or more of the raw data points. At later times, as new raw data is collected, the UDR summarizes the previously summarized data structures into still coarser summarized data structures. Each coarser summarized data structure preferably corresponds to two or more of the previously summarized data structures. The summarization of previously summarized data structures into coarser summarized data structures can be performed for any number of levels, as configured by the user. At each successive level of summarization, metric data becomes coarser in granularity: that is, the metric data representing a given period of time becomes more summarized and takes up less space.

In one embodiment, throughout the levels of summarization, the UDR preserves process state changes so that the record of a particular process is never totally lost. A process state change is the birth or death of a process at some point during the monitored time interval. In the preferred embodiment, furthermore, the UDR stores each level of summarization in a different file. In each file, the data points or summarized data structures are stored sequentially in order of collection. When one file fills up, i.e., reaches its maximum file size as configured by the user, the UDR summarizes the oldest data points or data structures in that file. The UDR then deletes the appropriate metric data from that file and pushes the newly summarized structure into the next coarsest file. When the coarsest file fills up, the oldest metric data structures from the coarsest file are deleted. The user may configure the number of levels of summarization and thus the number of files in the enterprise management system and method.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

U.S. Pat. No. 5,655,081 titled "System for Monitoring and Managing Computer Resources and Applications Across a Distributed Environment Using an Intelligent Autonomous Agent Architecture" is hereby incorporated by reference as though fully and completely set forth herein.

Figure 1:
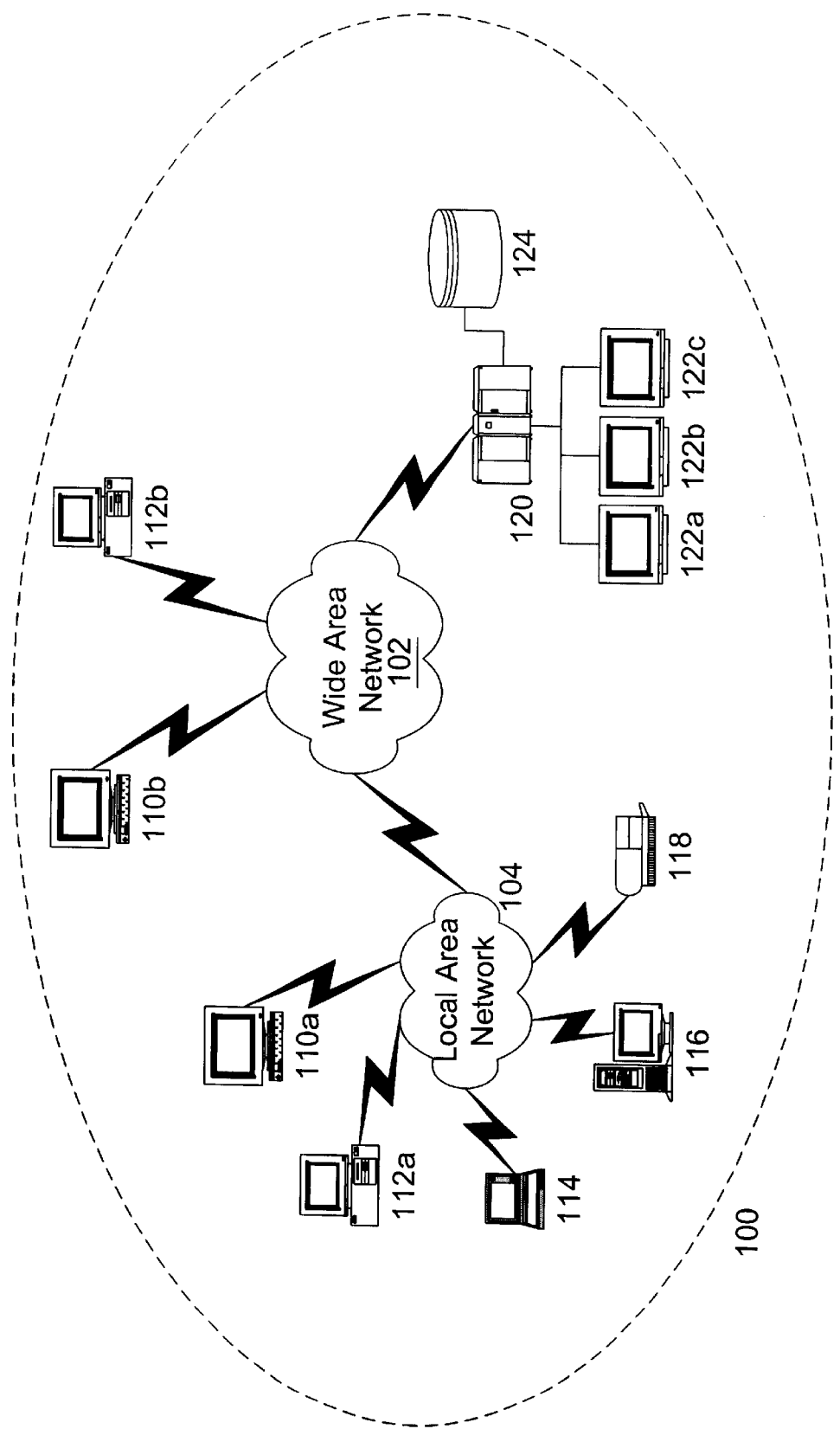
FIG. 1 is a network diagram of an illustrative enterprise computing environment.

FIG. 1 illustrates an enterprise computing environment according to one embodiment of the present invention. An enterprise 100 comprises a plurality of computer systems which are interconnected through one or more networks. Although one particular embodiment is shown in FIG. 1, the enterprise 100 may comprise a variety of heterogeneous computer systems and networks which are interconnected in a variety of ways and which run a variety of software applications.

One or more local area networks (LANs) 104 may be included in the enterprise 100. A LAN 104 is a network that spans a relatively small area. Typically, a LAN 104 is confined to a single building or group of buildings. Each node (i.e., individual computer system or device) on a LAN 104 preferably has its own CPU with which it executes programs, and each node is also able to access data and devices anywhere on the LAN 104. The LAN 104 thus allows many users to share devices (e.g., printers) as well as data stored on file servers. The LAN 104 may be characterized by any of a variety of types of topology (i.e., the geometric arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, radio waves). As illustrated in FIG. 1, the enterprise 100 includes one LAN 104. However, in alternate embodiments the enterprise 100 may include a plurality of LANs 104 which are coupled to one another through a wide area network (WAN) 102. A WAN 102 is a network that spans a relatively large geographical area.

Each LAN 104 comprises a plurality of interconnected computer systems and optionally one or more other devices: for example, one or more workstations 110a, one or more personal computers 112a, one or more laptop or notebook computer systems 114, one or more server computer systems 116, and one or more network printers 118. As illustrated in FIG. 1, the LAN 104 comprises one of each of computer systems 110a, 112a, 114, and 116, and one printer 118. The LAN 104 may be coupled to other computer systems and/or other devices and/or other LANs 104 through a WAN 102.

One or more mainframe computer systems 120 may optionally be coupled to the enterprise 100. As shown in FIG. 1, the mainframe 120 is coupled to the enterprise 100 through the WAN 102, but alternatively one or more mainframes 120 may be coupled to the enterprise 100 through one or more LANs 104. As shown, the mainframe 120 is coupled to a storage device or file server 124 and mainframe terminals 122a, 122b, and 122c. The mainframe terminals 122a, 122b, and 122c access data stored in the storage device or file server 124 coupled to or comprised in the mainframe computer system 120.

The enterprise 100 may also comprise one or more computer systems which are connected to the enterprise 100 through the WAN 102: as illustrated, a workstation 110b and a personal computer 112b. In other words, the enterprise 100 may optionally include one or more computer systems which are not coupled to the enterprise 100 through a LAN 104. For example, the enterprise 100 may include computer systems which are geographically remote and connected to the enterprise 100 through the Internet.

Figure 2:
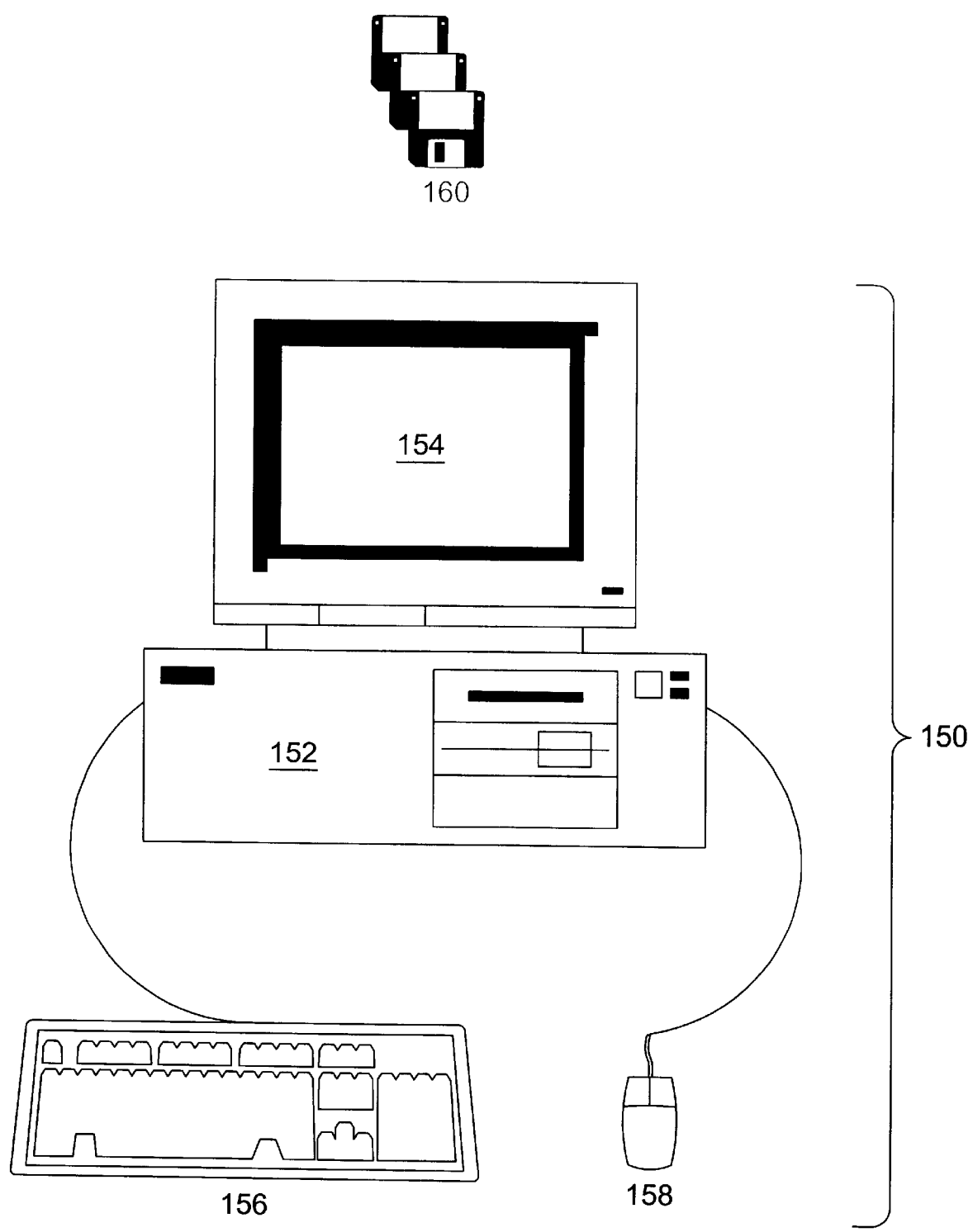
FIG. 2 is an illustration of a typical computer system with computer software programs.

The present invention preferably comprises computer programs 160 stored on or accessible to each computer system in the enterprise 100. FIG. 2 illustrates computer programs 160 and a typical computer system 150. Each computer system 150 typically comprises components such as a CPU 152, with an associated memory media. The memory media stores program instructions of the computer programs 160, wherein the program instructions are executable by the CPU 152. The memory media preferably comprises a system memory such as RAM and/or a nonvolatile memory such as a hard disk. The computer system 150 further comprises a display device such as a monitor 154, an alphanumeric input device such as a keyboard 156, and optionally a directional input device such as a mouse 158. The computer system 150 is operable to execute computer programs 160.

When the computer programs are executed on one or more computer systems 150, an enterprise management system 180 is operable to monitor, analyze, and manage the computer programs, processes, and resources of the enterprise 100. Each computer system 150 in the enterprise 100 executes or runs a plurality of software applications or processes. Each software application or process consumes a portion of the resources of a computer system and/or network: for example, CPU time, system memory such as RAM, nonvolatile memory such as a hard disk, network bandwidth, and input/output (I/O). The enterprise management system 180 permits users to monitor, analyze, and manage resource usage on heterogeneous computer systems 150 across the enterprise 100.

Figure 3:
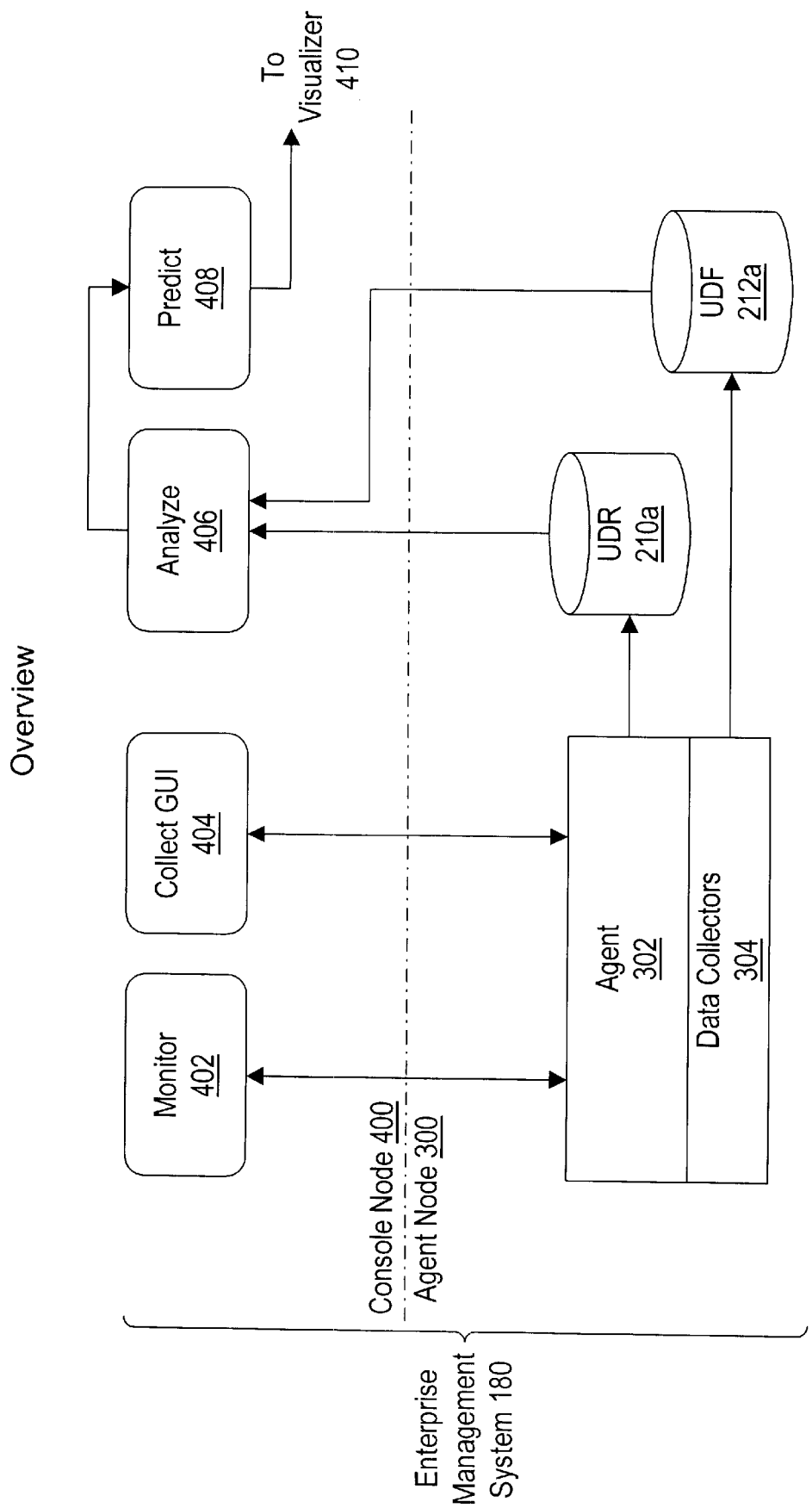
FIG. 3 is a block diagram illustrating an overview of the enterprise management system according to the preferred embodiment of the present invention.

FIG. 3 shows an overview of the enterprise management system 180. The enterprise management system 180 includes at least one console node 400 and at least one agent node 300, but it may include a plurality of console nodes 400 and/or a plurality of agent nodes 300. In general, an agent node 300 executes software to collect metric data on its computer system 150, and a console node 400 executes software to monitor, analyze, and manage the collected metrics from one or more agent nodes 300. A metric is a measurement of a particular system resource. For example, in the preferred embodiment, the enterprise management system 180 collects metrics such as CPU, disk I/O, file system usage, database usage, threads, processes, kernel, registry, logical volumes, and paging. Each computer system 150 in the enterprise 100 may comprise a console node 400, an agent node 300, or both a console node 400 and an agent node 300. In the preferred embodiment, server computer systems include agent nodes 300, and other computer systems may also comprise agent nodes 300 as desired, e.g., file servers, print servers, e-mail servers, and internet servers. The console node 400 and agent node 300 are characterized by an end-by-end relationship: a single console node 400 may be linked to a single agent node 300, or a single console node 400 may be linked to a plurality of agent nodes 300, or a plurality of console nodes 400 may be linked to a single agent node 300, or a plurality of console nodes 400 may be linked to a plurality of agent nodes 300.

In the preferred embodiment, the console node 400 comprises four user-visible components: a Monitor component 402, a Collect graphical user interface (GUI) 404, an Analyze component 406, and a Predict component 408. All four components 402, 404, 406, and 408 of the console node 400 are preferably part of the "BEST/1 FOR DISTRIBUTED SYSTEMS" software package or "PATROL" version 4.0, all available from BMC Software, Inc. The agent node 300 comprises an Agent 302, one or more data collectors 304, Universal Data Repository (UDR) history files 210a, and Universal Data Format (UDF) history files 212a. In alternate embodiments, the agent node 300 includes either of UDR 210a or UDF 212a, but not both. The Monitor component 402 allows a user to monitor, in real time, data that is being collected by an Agent 302 and being sent to the Monitor 402. The Collect GUI 404 is employed to schedule data collection on an agent node 302. The Analyze component 406 takes historical data from a UDR 210a and/or UDF 212a to create a model of the enterprise 100. The Predict component 408 takes the model from the Analyze component 106 and allows a user to alter the model by specifying hypothetical changes to the enterprise 100. Predict 408 can create output in a format which can be understood and displayed by a Visualizer tool 410. In the preferred embodiment, Visualizer 410 is the "BEST/1-VISUALIZER" available from BMC Software, Inc.

The Agent 302 controls data collection on a particular computer system and reports the data in real time to one or more Monitors 402. In the preferred embodiment, the Agent 302 is the part of the "BEST/1 FOR DISTRIBUTED SYS- TEMS" software package available from BMC Software, Inc. The data collectors 304 collect data from various processes and subsystems of the agent node 300. The Agent 302 sends real-time data to the UDR 210a, which is a database of historical data in a particular data format. The UDF 212a is similar to the UDR 210a, but the UDF 212a uses an alternative data format and is written directly by the data collectors 304.

Figure 4:
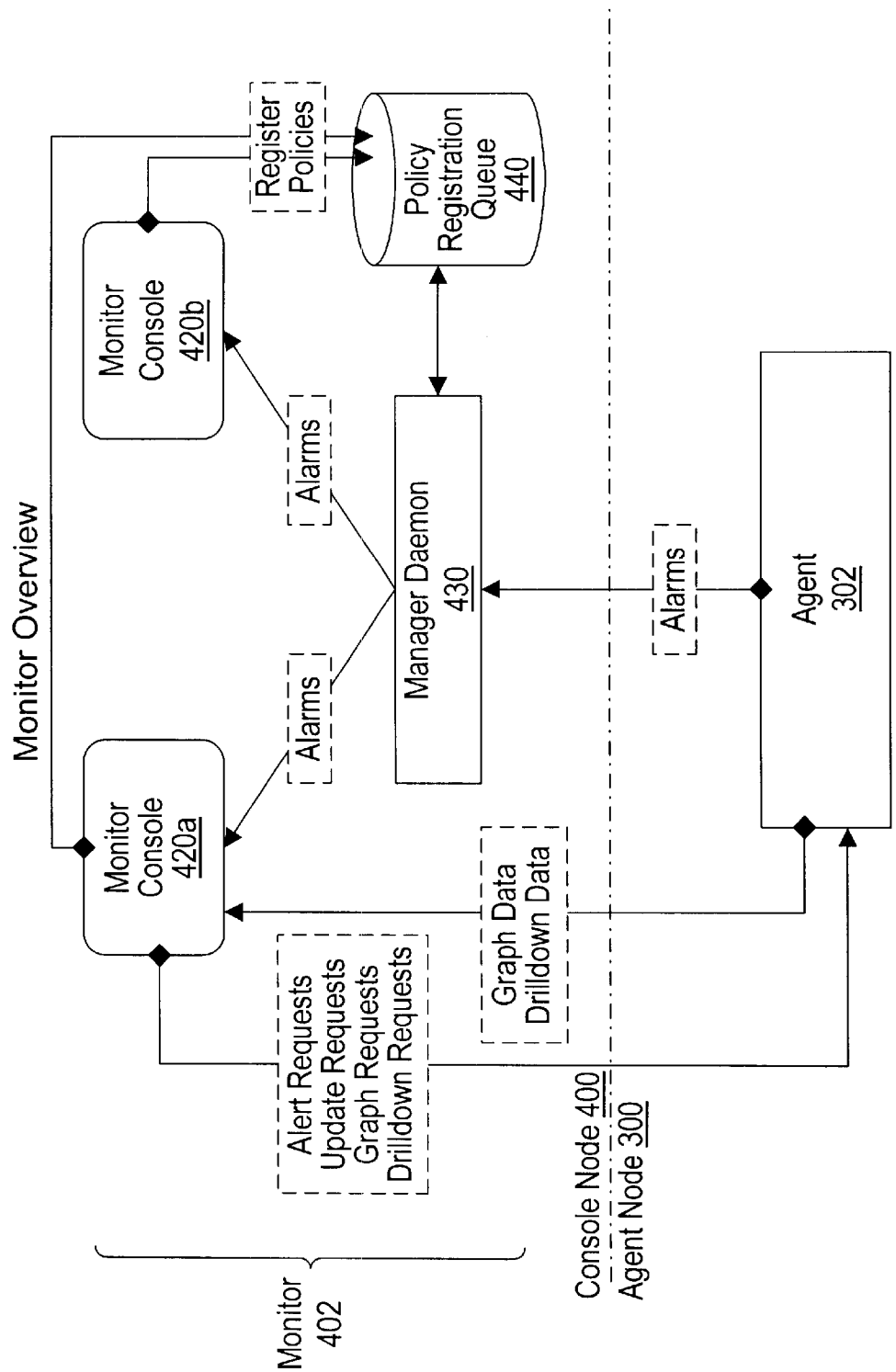
FIG. 4 is a block diagram illustrating an overview of the Monitor component of the enterprise management system according to the preferred embodiment of the present invention.

FIG. 4 shows an overview of the Monitor component 402 of the console node 400 of the enterprise management system 180. The Monitor 402 comprises a Manager Daemon 430, one or more Monitor Consoles (as illustrated, 420a and 420b), and a Policy Registration Queue 440. Although two Monitor Consoles 420a and 420b are shown in FIG. 4, the present invention contemplates that one or more Monitor Consoles may be executing on any of one or more console nodes 400.

In the preferred embodiment, the Monitor Consoles 420a and 420b use a graphical user interface (GUI) for user input and information display. Preferably, the Monitor Consoles 420a and 420b are capable of sending several different types of requests to an Agent 302, including: alert requests, update requests, graph requests, and drilldown requests. An alert request specifies one or more thresholds to be checked on a routine basis by the Agent 302 to detect a problem on the agent node 300. For example, an alert request might ask the Agent 302 to report to the Monitor Console 420a whenever usage of a particular software process exceeds a particular threshold relative to overall CPU usage on the agent node 300. An update request is a request for the status of the Agent 302. For example, the requested status information might include the version number of the Agent 302 or the presence of any alarms in the Agent 302. A graph request is a request to receive graph data, i.e., data on a metric as routinely collected by the Agent 302, and to receive the data in real time, i.e., whenever it becomes available from the present time onward. By obtaining and displaying graph data, the Monitor Console 420a enables the rapid identification and communication of potential application and system performance problems. Preferably, the Monitor Console 420a displays graph data in a graphical format. A drilldown request is a request to receive drilldown data, i.e., data on an entire metric group (a set of metrics) as collected by the Agent 302. By obtaining and displaying drilldown data, the Monitor Console 420a provides the ability to focus, in real-time, on a specific set of processes, sessions, or users. Preferably, the Monitor Console 420a displays drilldown data in a tabular format.

Whenever the Agent 302 generates an alarm to indicate a troublesome status on the agent node 300, the Manager Daemon 430 intercepts the alarm and feeds the alarm to one or more Monitor Consoles, such as 420a and 420b. Typically, an alarm is a notification that a particular threshold has been exceeded on a monitored process or subsystem on an agent node 300. The Manager Daemon 430 is capable of receiving alarms from a plurality of Agents 302. A Manager Daemon 430 is preferably always running on each console node 400 so that alarms can be captured even when the Monitor Consoles 420a and 420b are offline.

Each of the Monitor Consoles 420a and 420b is operable to issue one or more policies. A policy defines a disparate set of metrics to be collected on one or more agent nodes 300. In other words, a policy allows a Monitor Console 420a or 420b to monitor one or more metrics on one or more agent nodes 300 simultaneously. For example, a user could build and deploy a policy that restricts web browser access on a plurality of agent nodes 300 with the following set of interrelated conditions: "IF more than 80% of server CPU is required by critical production applications, AND the run queue length is greater than six, AND active time on production disks exceeds 40%." Policies are registered with the Policy Registration Queue 440, from which they are disseminated to the appropriate Agents 302. An Agent 302 can execute a plurality of policies simultaneously.

Figure 5:
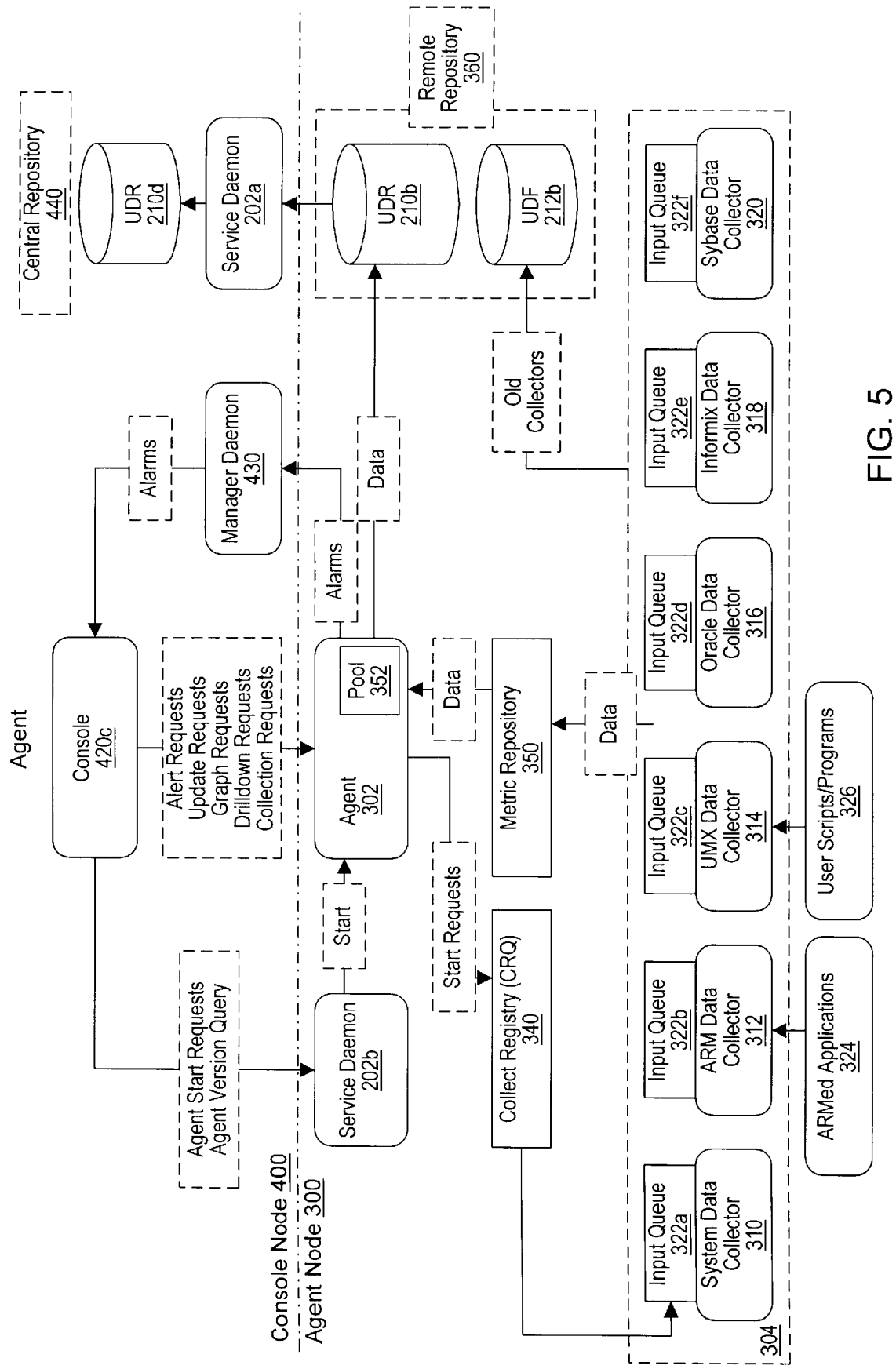
FIG. 5 is a block diagram illustrating an overview of the Agent component of the enterprise management system according to the preferred embodiment of the present invention.

FIG. 5 shows an overview of the Agent component 302 of the agent node 300 of the enterprise management system 180. In the preferred embodiment, every agent node 300 has one Agent 302. The Monitor Console 420c is another instance of the Monitor Consoles illustrated in FIG. 4 with reference numbers 420a and 420b.

When the user desires to start an Agent 302 and begin collecting data on a particular agent node 300, the user operates the Monitor Console 420c to issue an agent start request through a Service Daemon 202b. Preferably, the Service Daemon 202b is always executing on the agent node 300 in order to intercept messages from one or more Monitor Consoles 420c even when the Agent 302 is offline. In the preferred embodiment, the Service Daemon 202b is largely invisible to the user. The Service Daemon 202b also intercepts agent version queries from the Monitor Console 420c. An agent version query is a request for the current version number of the piece of software that comprises the Agent 302. As described above, the Monitor Console 420c is able to send alert requests, update requests, graph requests, and drilldown requests to the Agent 302. The Monitor Console 420c may also send collection requests, which are requests for the Agent 302 to begin collecting particular metrics or metric groups on the agent node 300.

When the Agent 302 receives a collect request from the Monitor Console 420c through the Service Daemon 202b, the Agent 302 initiates the collection through the Collect Registry Queue (CRQ) 340. The Agent 302 uses the Collect Registry Queue 340 to control and schedule data collection. By helping the Agent 302 know how many collectors 304 are running and whether the collectors 304 are each the right type, the Collect Registry Queue 340 prevents redundant collection. Each data collector 310, 312, 314, 316, 318, and 320 is designed to gather one or more metrics for the operating system and/or one or more subsystems. The present invention contemplates a variety of data collectors 304, but for illustrative purposes, the following are shown: system data collector 310 (which collects data from the operating system), ARM data collector 312 (which collects data from ARMed applications 324), UMX data collector 314 (which collects data from user scripts/programs 326), Oracle data collector 316 (which collects data from an "ORACLE" database management system), Informix data collector 318 (which collects data from an "INFORMIX" database management system), and Sybase data collector 320 (which collects data from a "SYBASE" database management system). Each of the collectors 310, 312, 314, 316, 318, and 320 has an associated input queue 322a, 322b, 322c, 322d, 322e, and 322f, respectively. The input queues 322a, 322b, 322c, 322d, 322e, and 322f store the requested metric groups and associated collection intervals for each collector 304. Although a collector 304 typically supports multiple metric groups, the collector 304 only collects those metric groups that are requested. After metric data is collected, the data is transferred to a Metric Repository 350. The Metric Repository 350 sits between the Agent 302 and the collectors 304 and provides fast interprocess communication between the Agent process 302 and the collector processes 304.

Metric data from the Metric Repository 350 is efficiently copied into the Metric Repository Pool 352, where the data is cached by metric group, instance, and collection rate. The Metric Repository Pool 352 is located in the memory space of the Agent 302 and is invisible to everything other than the Agent 302. By storing collected data for the metric groups in a single Metric Repository Pool 352 for each Agent 302 and agent node 300, the enterprise management system 180 prevents redundant collection: whether one Monitor Console 420c or a plurality of Monitor Consoles such as 420a through 420c request data collection for a particular metric group, the data is only collected once.

In the preferred embodiment, the Collect Registry Queue 340, Metric Repository 350, Metric Repository Pool 352, input queues 322a, 322b, 322c, 322d, 322e, and 322f, and Universal Data Repository (UDR) history files 210a, 210b, 210c, and 210d comprise a data structure called a base queue or BASEQ. A BASEQ is a contiguous relocatable heap of memory: in other words, the BASEQ provides random allocation of data in a contiguous block of storage. The BASEQ provides fast interprocess communication with locking synchronization between the consumer of data and the provider of data. The BASEQ can be stored in different types of memory, such as volatile memory like RAM or nonvolatile memory like a hard disk. In the preferred embodiment, the BASEQ is implemented as a base class in an object-oriented programming environment. In this embodiment, specialized variants of the BASEQ are implemented as derived classes which inherit the properties of the base class. For example, UDR 210a, 210b, 210c, and 210d are implemented with a derived class which is located on a file on disk, while Metric Repository 350 is implemented with a derived class which is located in a shared memory segment.

In the preferred embodiment, the enterprise management system 180 provides for the storage of historical metric data as well as the monitoring of real-time metric data. Therefore, in addition to passing the metric data to the Monitor Console 420c, the Agent may also send the metric data to a Remote Repository 360 for storage. The Remote Repository 360 is located on the agent node 300, and each agent node 300 may have its own Remote Repository 360. The Remote Repository comprises a database in the Universal Data Repository (UDR) format 210b and/or a database in the Universal Data Format (UDF) format 212b. The UDF 212b is an alternative data format to the UDR 210b and is used primarily by older ones of the collectors 304. The UDR format 210b is multi-node: it can store data from multiple sources in one place. UDR 210b is also multi-rate: it can store data at a plurality of levels of varying granularity by sending data at each successive level through an intelligent summarization process according to the present invention. Historical data can also be stored in a Central Repository 440 on the console node 400. A Service Daemon 202a controls the data transfer from the Remote Repository 360 to the Central Repository 440. In the preferred embodiment, the Central Repository 440 comprises a UDR 210d.

Figure 6:
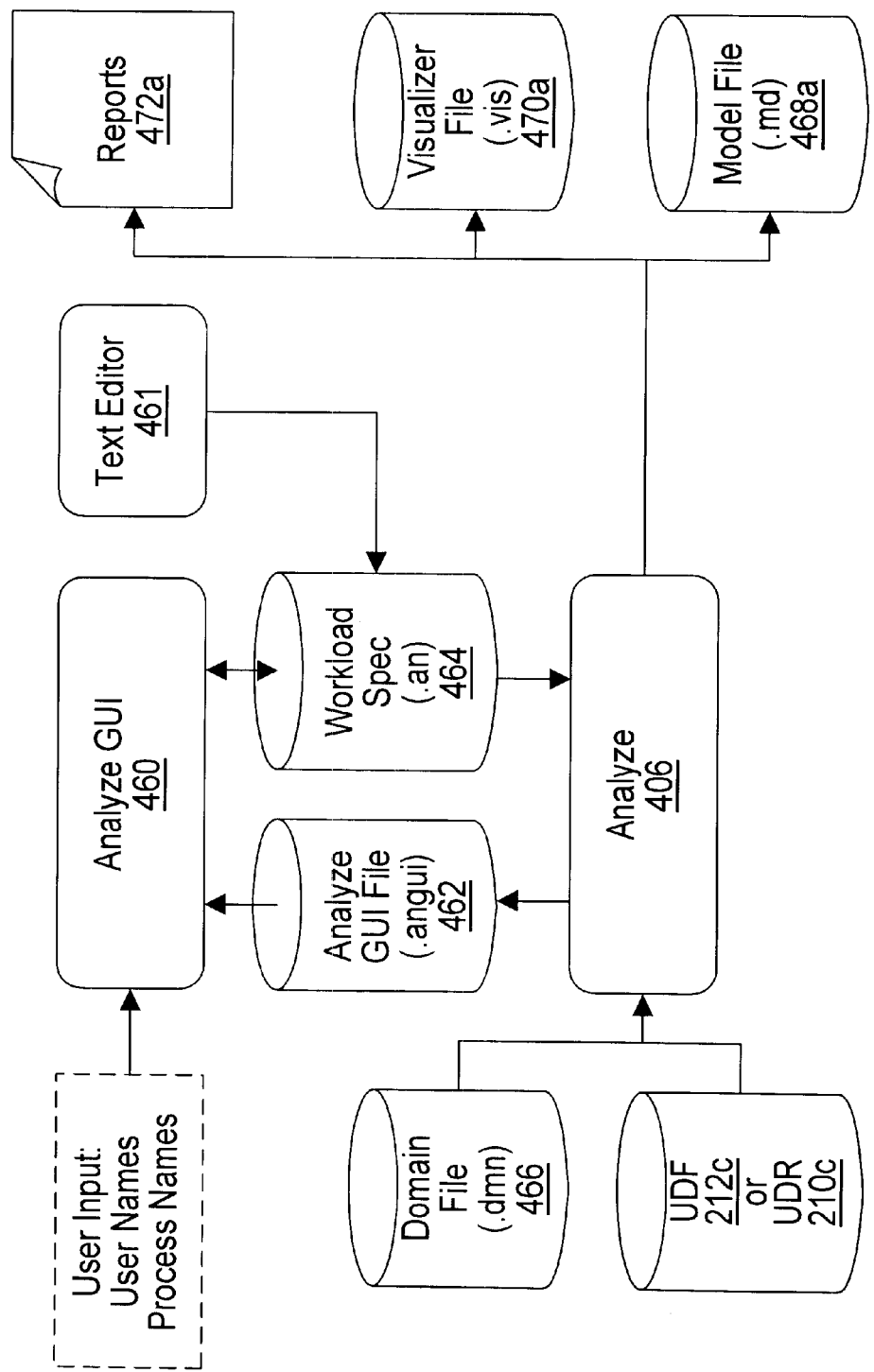
FIG. 6 is a block diagram illustrating an overview of the Analyze component of the enterprise management system according to the preferred embodiment of the present invention.

FIG. 6 illustrates an overview of the Analyze component 406 of the console node 400 of the enterprise management system 180. In the preferred embodiment, Analyze 406 comprises the "ANALYZE" portion of the "BEST/1 FOR DISTRIBUTED SYSTEMS" software package available from BMC Software, Inc. Essentially, Analyze 406 takes the data collected by one or more Agents 302 and creates a model of one or more computer systems and the processes that run on those computer systems. In the preferred embodiment, Analyze 106 can model multi-vendor environments, system memory, multiple processors, disk drives, logical volumes, RAID devices, load balancing, ASCII and X terminals, local and remote file servers, independent and dependent transactions, client/server workloads, private and shared memory/transaction, CPU priority scheduling, networks of different types, and "ORACLE", "SYBASE", and "INFORMIX" database environments. In the preferred embodiment, Analyze 406 takes as input a domain file 466 which identifies the agent nodes 300 on the network and the relationship between them. Analyze 406 also takes as input a data repository in either UDF 212c or UDR 210c format, wherein the data repository 212c or 210c is a set of metric groups collected from one or more agent nodes 300.

The Analyze user then can either use a default workload specification (.an) 464 or create his or her own, either with the supplied graphical user interface (GUI) 460 or with a standard text editor 461. A workload specification 464 includes a user name, a process name, and other information. A workload is a useful grouping of key performance metrics. For example, the user might classify a plurality of Oracle-related processes as an "Oracle" workload, a plurality of other processes as a "payroll" workload, and the remainder as a "miscellaneous" workload. From this classification data, the Analyze engine 406 creates an Analyze GUI file 462 which contains a list of processes captured within the analysis interval. The Analyze GUI file 462 is then passed to the Analyze GUI 460.

Using the Analyze GUI file 462, the domain file 466, and the UDF 212c or UDR 210c data repository, Analyze 406 can create several forms of output. First, Analyze 406 can create a model file 468a. The model file 468a is a model of the workload data as contained in UDF 212c or UDR 210c and as classified by the user through the Analyze GUI 460 and/or standard text editor 461. Second, Analyze 406 can create reports 472a, which comprise the results of user-specified queries concerning workload characteristics. For example, one instance of reports 472a could be a list of the top ten workloads sorted by total CPU usage. Third, Analyze 406 can create a Visualizer file 470a, wherein the Visualizer file 470a is a description of the characteristics of the enterprise 100 as determined by the collected metrics and the user input. The Visualizer file 470a can be read and utilized by the Visualizer tool 410. In the preferred embodiment, Visualizer 410 is the "BEST/1-VISUALIZER" available from BMC Software, Inc. With Visualizer 410, performance statistics and workloads can be graphed, compared, drilled down, and visually analyzed to pinpoint hot spots or trends to assist in resource management, system tuning, and configuration changes. Visualizer 410 preferably includes functionality known as MASF (Multivariate Adaptive Statistical Filtering). Using standard deviation techniques, MASF continually interprets performance data and calculates normalcy. MASF graphs are thus used to discover true performance anomalies that deviate from normal performance behavior. In addition to creating Visualizer file 470a and reports 472a, Analyze 406 also generates Model files 468a for performance prediction of the system within an enterprise computing environment 100.

Figure 7:
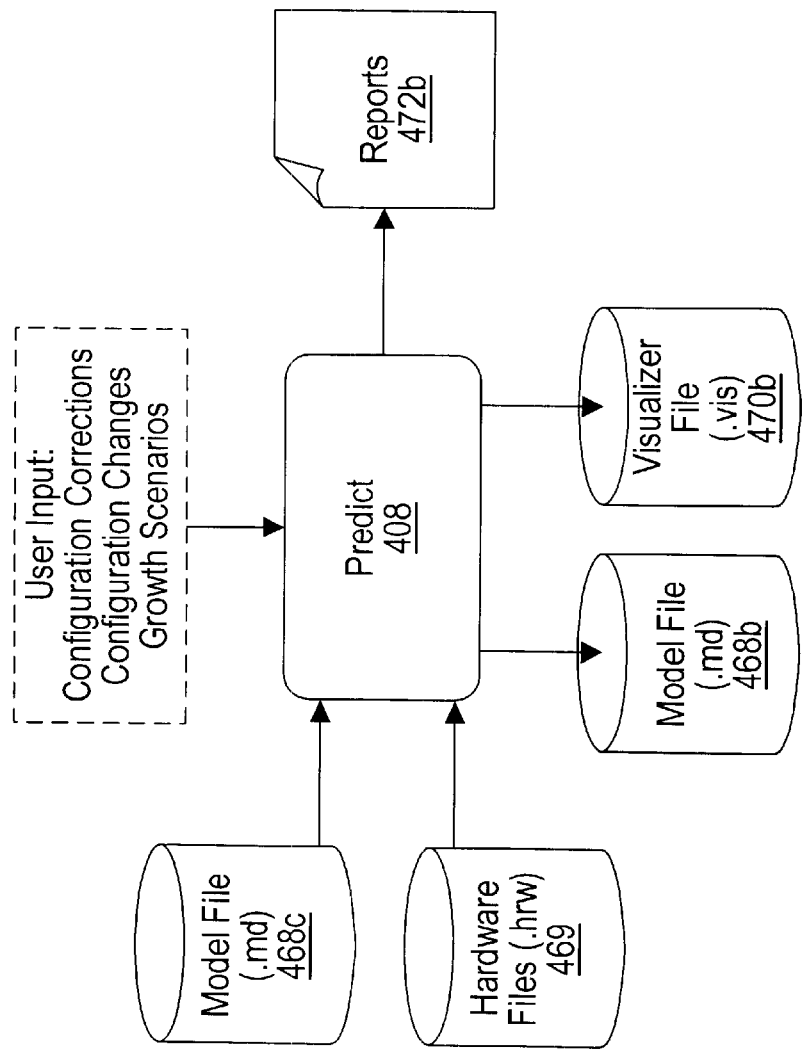
FIG. 7 is a block diagram illustrating an overview of the Predict component of the enterprise management system according to the preferred embodiment of the present invention.

FIG. 7 shows an overview of the Predict component 408 of the console node 400 of the enterprise management system 180. In the preferred embodiment, Predict 408 comprises the "BEST/1-PREDICT" component of the "BEST/1 FOR DISTRIBUTED SYSTEMS" software package available from BMC Software, Inc. Predict 408 is a planning tool which forecasts the impact of hypothetical changes on elements of the enterprise 100 such as disparate hardware, software, applications, and databases. Predict 408 takes the workload data from a Model File 468c, such as the Model File 468a generated by Analyze 406, and computes performance statistics such as workload response times, utilization, and throughputs at CPUs, disks, networks, and other elements of the enterprise computing environment 100. Thus, Predict 408 constructs a baseline model from collected data that represents the essence of the system under management. The user can also operate Predict 408 to construct the baseline model from pre-built model components, or from a combination of collected data and pre-built components. Preferably, Predict 408 uses a graphical user interface (GUI) for user input and information display.

After the baseline model has been constructed, the user can modify the baseline model by specifying configuration corrections, configuration changes, and/or growth scenarios. With Predict 408, the user can change one or more attributes of any model, creating "what if?" or hypothetical scenarios. By using methods, modeling techniques, and statistical formulas taken from queuing theory, Predict 408 accurately determines the impact of these workload and configuration changes on performance and response time. As one of the results of "what if?" computation, the changes to the baseline are displayed as unitless, numerical response time values relative to the baseline value of one. In the preferred embodiment, response times are broken down into four key components: CPU service time and wait time, I/O service time and wait time, network service time and wait time, and wait time for transactions running on external systems. Using the four key components, Predict 408 also preferably calculates other critical performance metrics such as throughput rates, CPU queue lengths, disk queue lengths, paging rates, and the amount of memory required to eliminate excessive paging.

Predict 408 preferably includes a multivendor hardware table 469, wherein the table includes the hardware specifications that Predict 408 uses to calculate the performance of hypothetical changes to the enterprise 100. Therefore, changes to CPU, memory, I/O, priorities, transaction rates, and other attributes can be evaluated across a plurality of heterogeneous computer systems 150. Furthermore, in modeling the configuration and workload changes across multiple systems, Predict 408 automatically calculates interaction and interference between systems. Predict 408 also preferably provides scenario planning, or modeling incremental growth over time, in order to determine the life expectancy of computing resources and the point at which resources should be upgraded to ensure that performance remains at an acceptable level. In the various ways set forth above, Predict 408 thus permits a user to plan for the future by "test driving" both actual and alternative or hypothetical configurations of the enterprise 100.

Like Analyze 406, Predict 408 can generate reports 472b, a Visualizer file 470b, and a model file 468b. The model file 468b can be modified and passed back to Predict 408 for additional modeling.

The UDR data format 210a, 210b, 210c, and 210d includes automatic data summarization by data type and/or includes summarization with a plurality of levels of granularity. Summarization operates on two or more data points of a particular metric and creates a smaller, summarized version of the metric data by applying different summarization rules to different data types. Summarization can operate both on raw, unsummarized data and on data that has previously been summarized one or more times. With each successive summarization, data becomes smaller and coarser in granularity. In the preferred embodiment, the level of summarization corresponds to the age of the data. The UDR format 210a through 210d thus permits the storage of metric data representing a longer period of time than could be maintained without summarization or without a plurality of levels of granularity.

Preferably, all of the metrics can be classified as one of a limited number of key data types. Examples of data types include, but are not limited to, a counter, a gauge, or a string. A gauge is a number that can go up or down from data point to data point. For example, the speed of an automobile or the utilization percentage of a CPU would be measured by a gauge. A counter is a number that is monotonically increasing from one data point to the next: it can only go up, never down. For example, the odometer in an automobile, i.e., the indicator of total distance traveled, or the total number of disk accesses over the lifetime of a disk would be measured by a counter. A string is a series of characters which are manipulated as a group, as is well known in the art. Furthermore, the key data types may have additional variants, such as a clock, which is a form of counter representing elapsed time. Thus, each of the metrics has a semantic, i.e., a meaning, attached to it. The summarization method functions more intelligently by applying different summarization rules according to the semantics of the data type of each metric.

Figures 8A, 8B:
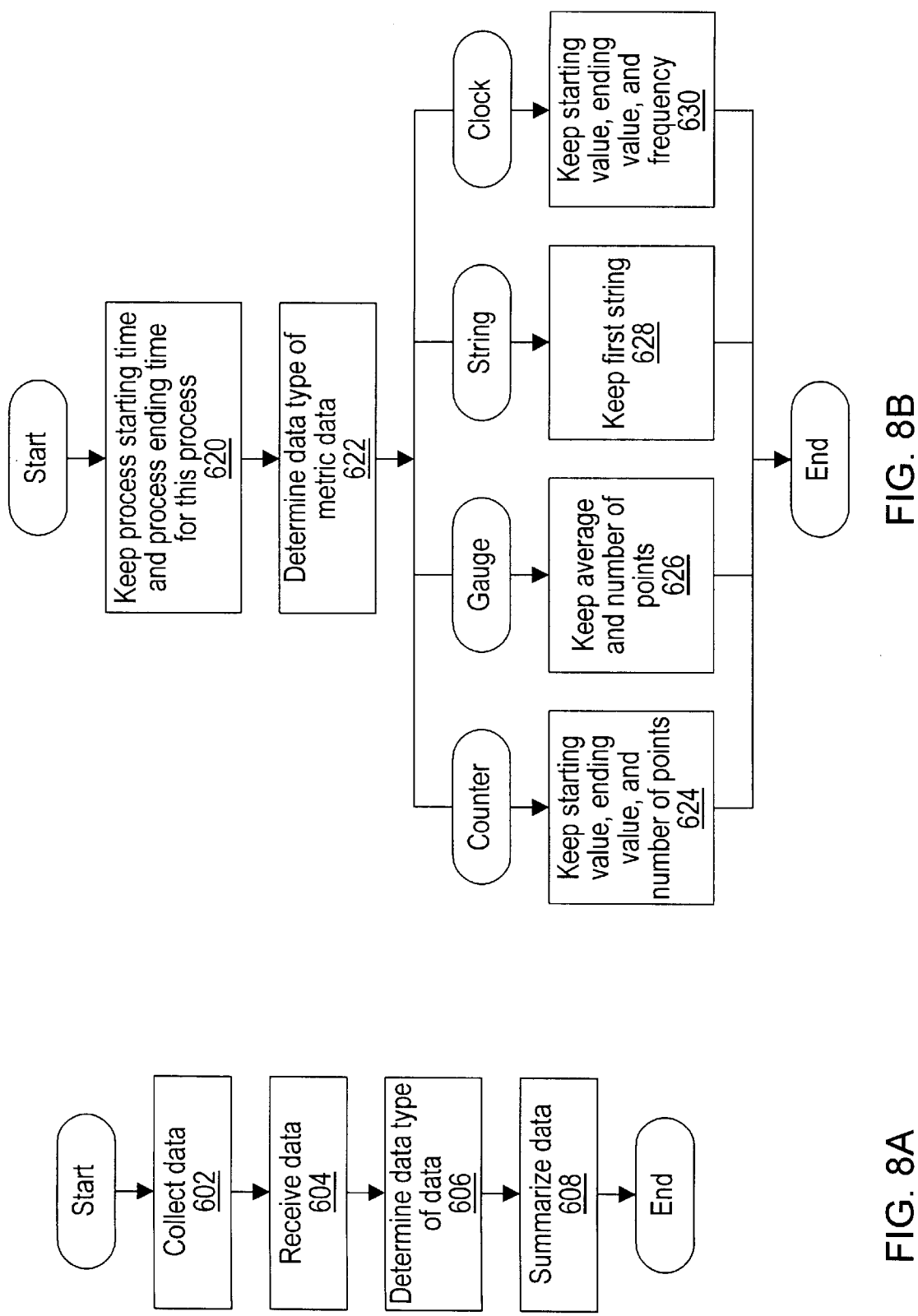
FIG. 8a is a flowchart illustrating the semantically correct nature of summarization.
FIG. 8b is a flowchart illustrating the semantically correct summarization rules for several representative data types.

FIG. 8a is a flowchart showing an overview of the semantically correct nature of the summarization of raw metric data. In step 602 a series of data points are collected for a particular metric. In step 604 the data is received by the UDR. In step 606 the UDR determines the data type of the data. In step 608 the UDR sumnarizes the data according to the determined data type.

FIG. 8b is a more detailed flowchart illustrating the semantically correct nature of the summarization system and method. The data types shown in FIG. 8b are merely indicative of the major data types as described above; the summarization system and method contemplates additional data types not included in FIG. 8b, each data type with its own semantic and associated summarization rule. The steps of FIGS. 8a and 8b are applied to a set of data points belonging to a particular metric, i.e., a particular performance measurement, which are to be combined into a single, summarized data structure. FIGS. 8a and 8b may occur for a plurality of metrics and a plurality of sets of data points for each metric.

Each raw data point has an associated timestamp which is generated at the time of collection. Regardless of the data type, during summarization the first and last timestamps over the summarization interval are maintained in the summarized data structure. In step 620 the summarization method uses these timestamps to maintain process state changes: the starting time, if known, and the ending time, if known, for the process associated with this metric. Step 620 thus maintains process state changes throughout the levels of summarization, so that a process is not averaged out of existence or otherwise lost when the summarization rules are applied.

In step 622 the UDR determines the data type of the metric data. Next, the UDR applies a summarization rule, depending upon the data type determined in step 622. If the data type is a counter, then in step 624 the method applies a summarization rule which keeps the starting value, the ending value, and the number of data points. If the metric is a gauge, then in step 626 the method applies a summarization rule which keeps the average of the data points and the number of data points. If the metric is a string, then in step 628 the method applies a summarization rule which keeps the first string value over the summarization interval. In step 630 the method determines whether this metric is a clock. If the metric is a clock, then in step 618 the method applies a summarization rule which keeps the starting value, the ending value, and the frequency of the clock.

The system and method of the present invention contemplates additional data types not illustrated in FIG. 8b. The following table lists data types in the preferred embodiment, along with the raw format, summarization rule, and summarized format for each data type. Regardless of data type, the beginning and ending timestamp over the interval and the number of samples or data points are also preferably stored; therefore, these elements are not included in the "Summarization Rule" column of the table.

| Data Type | Raw Format | Summarization Rule | Summarized Format |
|---|---|---|---|
| UDFChar | N byte string | First string | Same as raw |
| UDFVChar | -4 byte integer (size) -4 byte integer (offset) -variable length string | First string | Same as raw |
| UDFIdInt | 4 byte signed integer | Last value | Same as raw |
| UDFIdUint | 4 byte unsigned integer | Last value | Same as raw |
| UDFUtime | 4 byte integer (seconds) | Last value | Same as raw |
| UDFUtimeVal | 4 byte integer (seconds) 4 byte integer ($10^{-6}$ sec) | Last value | Same as raw |
| UDFIdInt8 | 8 byte integer | Last value | Same as raw |
| UDFFloat | 4 byte signed integer 4 byte integer ($10^{-9}$) | Average | Same as raw |
| UDFInt4 | 4 byte signed integer | Average | 4 byte integer (whole part) 4 byte integer (fractional part $10^{-9}$) |
| UDFUint4 | 4 byte unsigned integer | Average | 4 byte integer (whole part) 4 byte integer (fractional part $10^{-9}$) |
| UDFInt8 | 8 byte signed integer | Average | 8 byte integer (whole part) 4 byte integer (fractional part $10^{-9}$) |
| UDFUint8 | 8 byte unsigned integer | Average | 8 byte integer (whole part) 4 byte integer (fractional part $10^{-9}$) |
| UDFCount | 4 byte integer | First, last values | 4 byte integer (first value) 4 byte integer (last value) |
| UDFCount8 | 8 byte integer | First, last values | 8 byte integer (first value) 8 byte integer (last value) |
| UDFIntTime | 4 byte integer (seconds) | First, last values | 4 byte integer (first value) 4 byte integer (last value) |
| UDFTimeVal | 4 byte integer (seconds) 4 byte integer ($10^{-6}$ sec) | First, last values | 4 byte integer (seconds) (first) 4 byte integer ($10^{-6}$ sec) 4 byte integer (seconds) (last) 4 byte integer ($10^{-6}$ sec) |
| UDFTimeTic | 4 byte integer (tics) 4 byte integer ($10^{-6}$ tics) | First, last values | 4 byte integer (tics) (first) 4 byte integer ($10^{-6}$ tics) 4 byte integer (tics) (last) 4 byte integer ($10^{-6}$ tics) |
| UDFTimeMicro | 4 byte integer (usec) 4 byte integer ($10^{-6}$ usecs) | First, last values | 4 byte integer (usec) (first) 4 byte integer ($10^{-6}$ usecs) 4 byte integer (usec) (last) 4 byte integer ($10^{-6}$ usecs) |
| UDFRatioUint4 | 4 byte integer (numerator) 4 byte integer (denominator) | Average | 4 byte unsigned integer 4 byte unsigned integer ($10^{-9}$) |
| UDFRatioCount | 4 byte integer (numerator) 4 byte integer (denominator) | First, last values | 4 byte integer (numerator) (first) 4 byte integer (denominator) (first) 4 byte integer (numerator) (last) 4 byte integer (denominator) (last) |
| UDFAvgTime8 | 8 byte integer (num) (time) 4 byte integer (den) (ops) | First, last values | 8 byte integer (num) (time) (first) 4 byte integer (den) (ops) (first) 8 byte integer (num) (time) (last) 4 byte integer (den) (ops) (last) |
| UDFAvgCount8 | 8 byte integer (num) 4 byte integer (den) (ops) | First, last values | 8 byte integer (num) (first) 4 byte integer (den) (ops) (first) 8 byte integer (num) (last) 4 byte integer (den) (ops) (first) |

Figure 11:
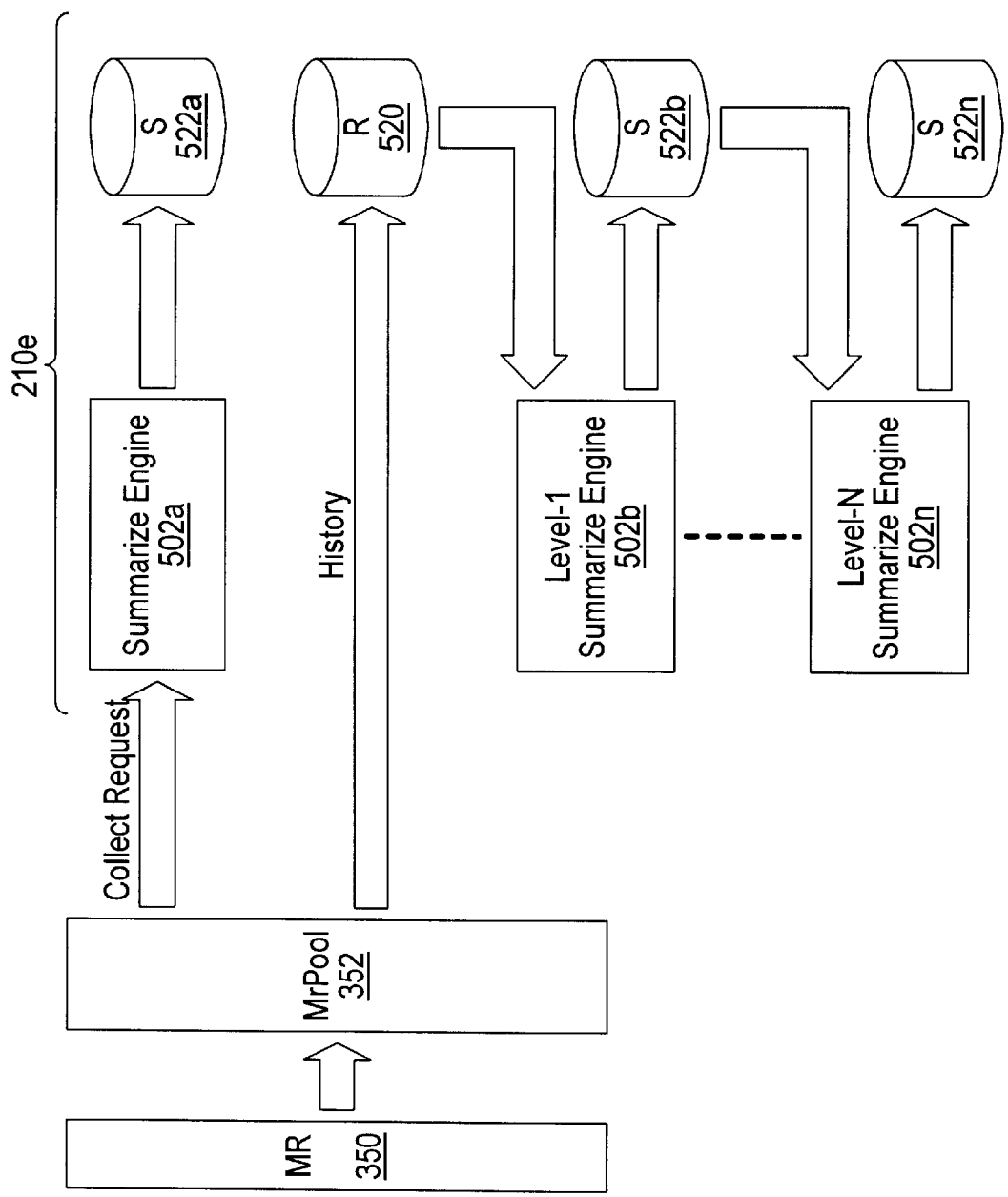
FIG. 11 is a block diagram illustrating the interface between the Agent and the Data Repository (UDR)

As illustrated in FIG. 11, summarization preferably occurs in two types of situations: to satisfy a one-time collect request, and to store metric history on a routine basis. A collect request is initiated by a module on a console node 400, such as Analyze 406 or Predict 408. The collect request specifies three values: a collection rate, i.e., how often the metric data is to be collected from the agent node 300; a summarization or spill interval, i.e., how often the raw spills are to be summarized; and a collection interval, i.e., the total period of time of the data collection. The number of raw spills that will be summarized into a single summarized spill equals the spill interval divided by the sample rate. For example, if the request is to sample data every 10 seconds and to summarize data every 15 minutes, then each summarized spill will comprise 90 data points, i.e., 900 seconds divided by 10 seconds. The number of summarized spills that comprise the summarized file sent back to the requesting console node 400 equals the collection interval divided by the spill interval. For example, if the request is for 24 hours' worth of collection with data to be summarized every 15 minutes, then there will be 96 summarized spills, i.e., 1440 minutes divided by 15 minutes, sent back to the requesting console node 400 at the end of the 24 hour collection interval.

Figure 9:
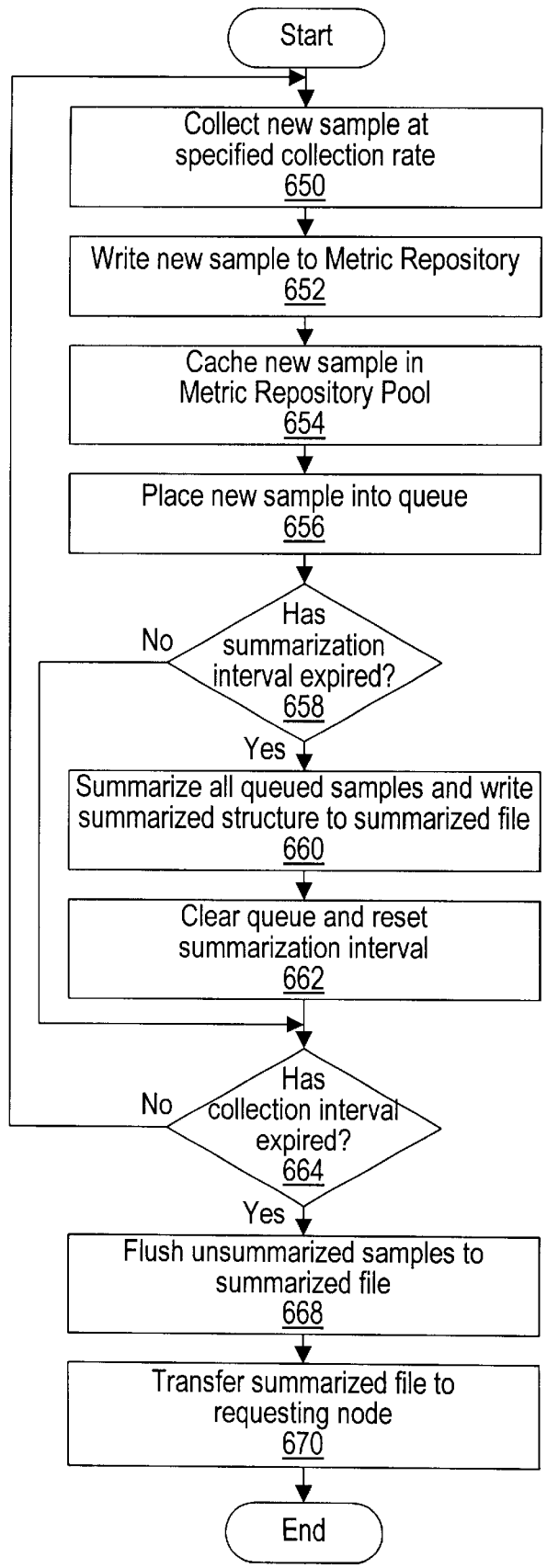
FIG. 9 is a flowchart illustrating the summarization method for a one-time collect request.

FIG. 9 is a flowchart illustrating the steps in the summarization that results from a collect request. FIG. 11 is a block diagram illustrating the relationship between the elements set forth in FIG. 9. In step 650 of FIG. 9, a data collector 304 collects a new sample, i.e., a new data point, at the specified collection rate. In step 652 the collected metric sample is transferred from the data collector 304 to the Metric Repository 350. As described above, the Metric Repository 350 allows for interprocess communication between the data collectors 304 and the Metric Repository Pool 352 of the Agent 302. In the preferred embodiment, the Metric Repository 350 is implemented as a BASEQ stored in a shared memory segment. In step 654 the sample is copied from the Metric Repository 350 to the Metric Repository Pool 352. The Metric Repository Pool 352 is preferably implemented as a BASEQ contained within the memory space of the Agent 302, and consequently the copying of metric samples from the Metric Repository 350 to the Metric Repository Pool 352 is very fast.

In step 656 the new sample is placed in a queue, preferably in the Metric Repository Pool 352, but in an alternate embodiment the new sample is placed in a queue in a Summarize Engine 502a. In step 658 the method determines whether the summarization interval, i.e., spill interval, has expired. If the summarization interval has not expired, then the method proceeds to step 664. If the summarization interval has expired, then it is time to summarize all the queued samples. In step 660 the Summarize Engine 502a summarizes the queued samples as described with reference to FIG. 8 and then writes the resulting summarized data structure to a summarized data file 522a. Each summarized data structure comprises the information from at least two raw data points or from at least two previously summarized data structures. In step 662 the method clears the samples from the queue and resets the summarization interval to the beginning.

In step 664, which occurs whether or not the summarization interval has expired, the method determines whether the collection interval has expired. If the collection interval has not expired, then the method goes back to step 650 to collect another sample. If the collection interval has expired, then it is time to end collection and send the results of the collect request back to the requesting console node 400, so the method proceeds to step 668. In step 668 any unsummarized samples and incomplete spills are flushed to the summarized file 522a. In step 670 the summarized file 522a is transferred to the requesting console node 400.

Figure 10A:
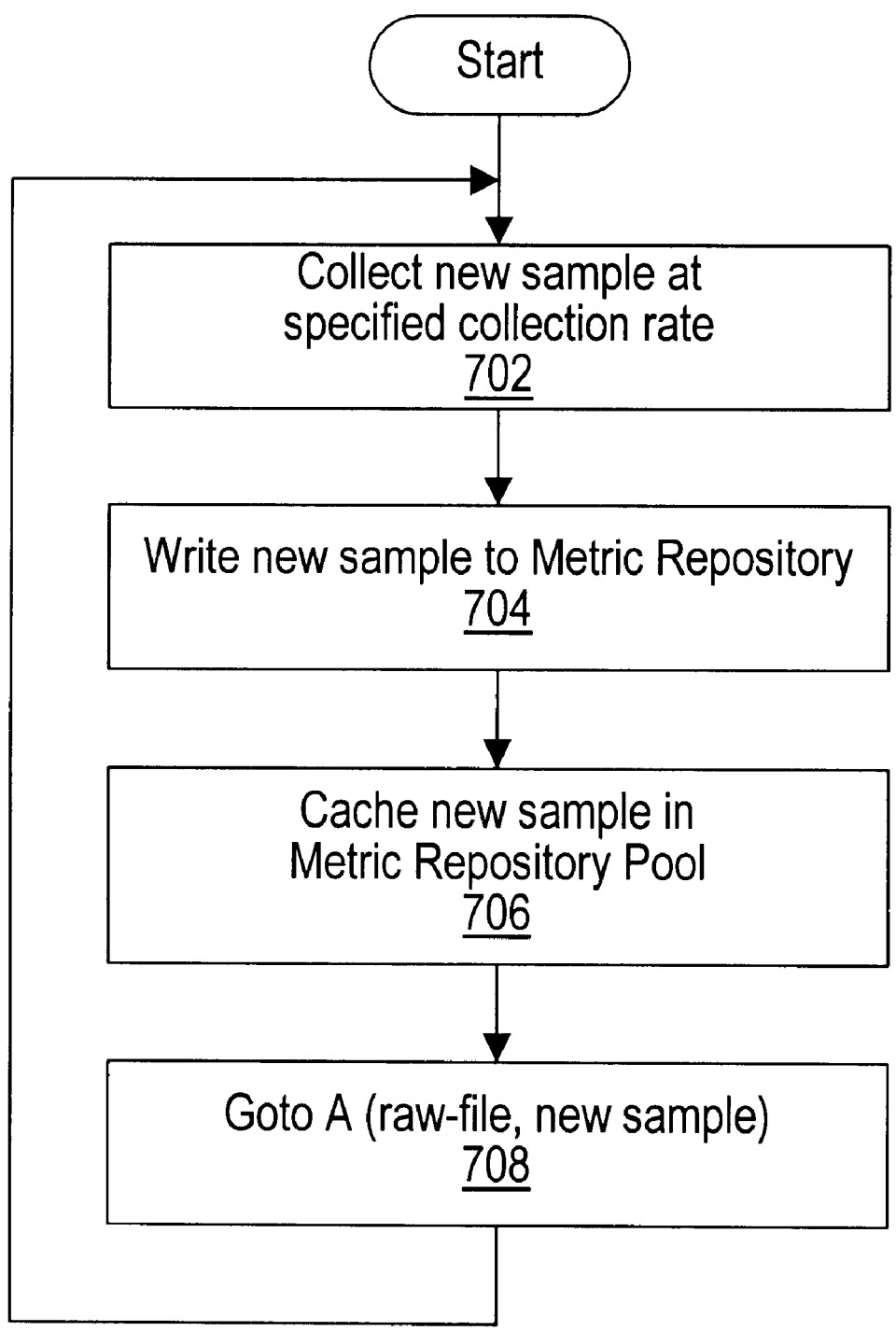
FIGS. 10a and 10b are flowcharts illustrating the summarization method for historical data in a plurality of levels of granularity.
Figure 10B:
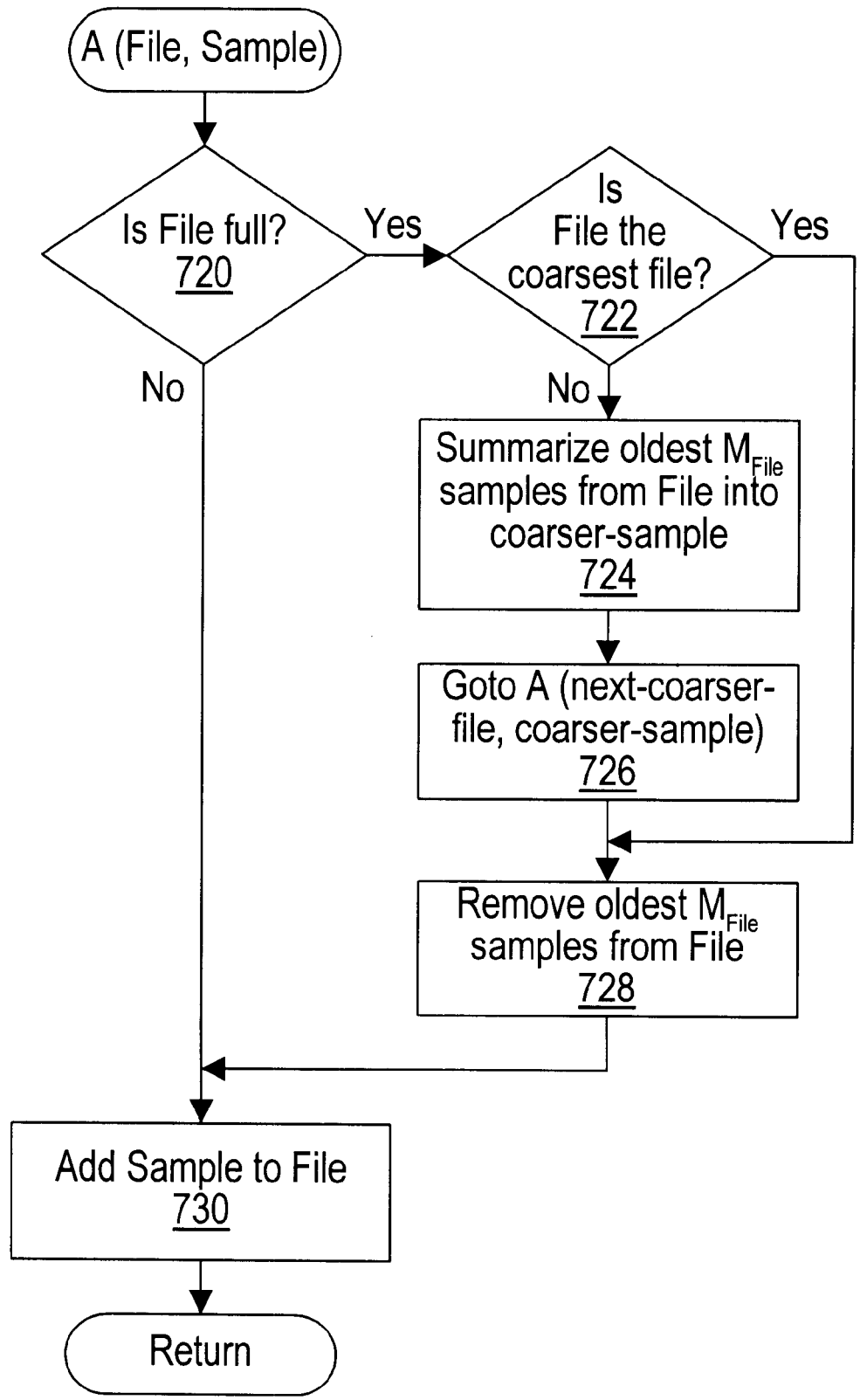
Figure 12:
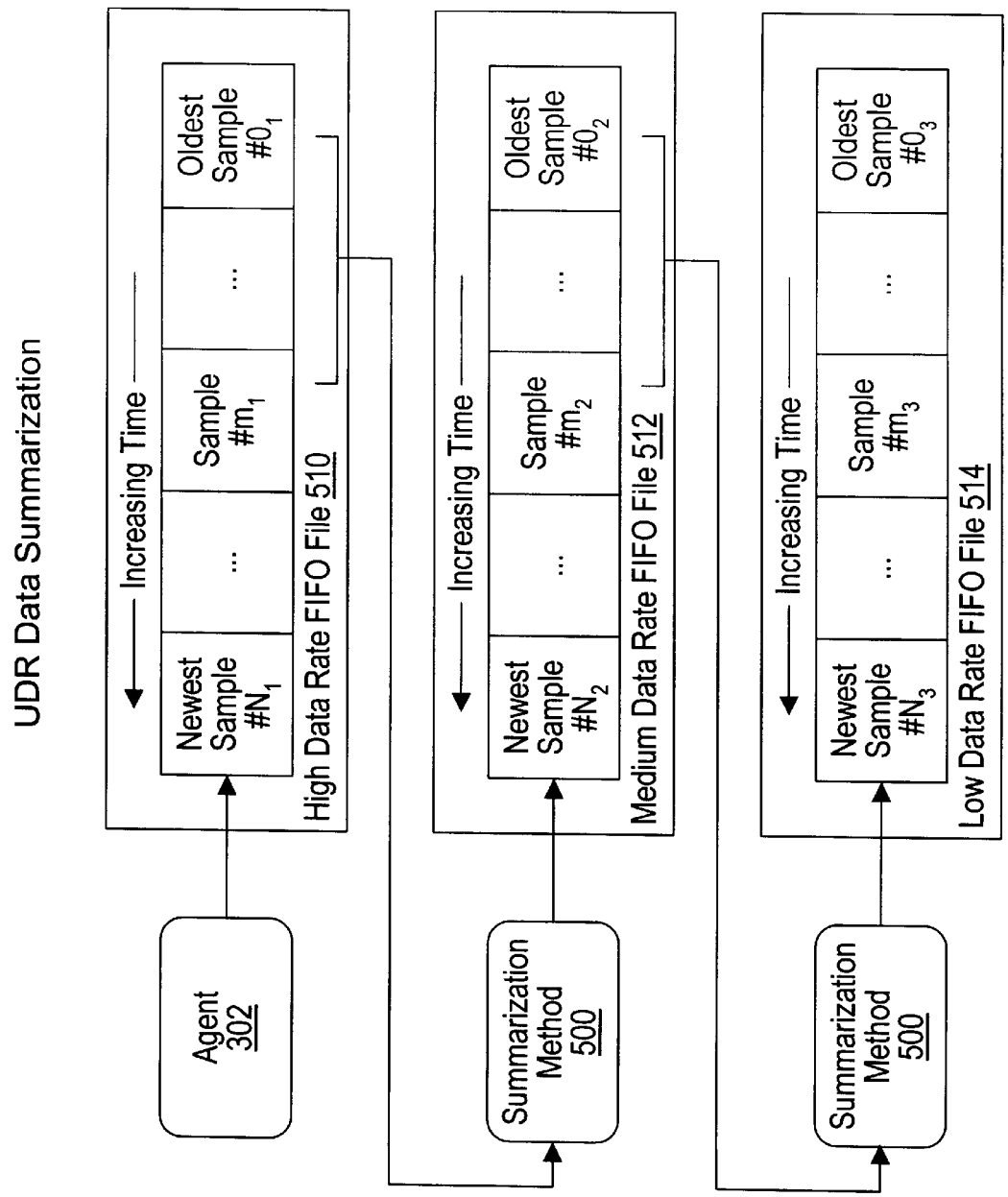
FIG. 12 is a block diagram illustrating summarization with three levels of granularity.

The method also provides for the summarization and storage of historical metric data at a plurality of levels of varying granularity. FIGS. 10a and 10b show a flowchart of historical summarization, and FIGS. 11 and 12 show block diagrams illustrating the key components of the method. As shown in FIG. 11, the UDR format 210e comprises a plurality of Summarize Engines 502a through 502n, a raw data file 520, and one summarized data file 522a through 522n for each Summarize Engine 502a through 502n. The Summarize Engines 502a through 502n may comprise the same software program being executed a plurality of times. The Summarization Method 500 of FIG. 12 comprises each of the Summarize Engines 502a through 502n as shown in FIG. 11.

In step 702 of FIG. 10a, for historical summarization as for a collect request, a sample of raw metric data gets collected at the specified sample rate. In step 704 the sample is written to the Metric Repository 704. In step 706 the sample is cached in the Metric Repository Pool 352. By collecting the data only once and by using the Metric Repository Pool 352 to make the same metric data available to all consumers, the Agent 302 prevents redundant collection.

Step 708 is an invocation of a recursive method A, as shown in FIG. 10b, for the raw data file 520 and the newly collected sample. Method A is shown as a function or method which takes as parameters a filename "File" and a metric data point "Sample." Method A may be repeated a plurality of times and may invoke itself a plurality of times. Although method A is shown as a recursive method for ease of illustration, method A could alternately be an iterative method.

In step 720 the method determines whether File is full, i.e., whether File is equal to a specified maximum size $N_{File}$. The user can configure the maximum size of the data file at each level of summarization, and the user can configure the number of levels of summarization. For example, in FIG. 12 there are three data files: one raw file 510 and two summarized files 512 and 514.

Back to step 720 of FIG. 10b, if File is not full, i.e., if File is less than its specified maximum size $N_{File}$, then the method adds Sample to File in step 730 and then returns to the point at which method A was invoked.

If File is full, however, in step 722 the method determines whether File is the coarsest file. The coarsest file is the ultimate, most summarized level of the one or more levels of granularity. If File is the coarsest file, then the method proceeds to step 728, where the oldest $M_{File}$ samples are removed from File and thrown away to make space for the new Sample. Then in step 730, the method adds Sample to File and returns to the point at which method A was invoked.

If File is not the coarsest file, then the method shifts $M_{File}$ samples to the file at the next level of granularity to make space for the new Sample in File. In step 724 the method summarizes the oldest $M_{File}$ samples from File as described with reference to FIG. 8. The result is coarser-sample, which is a summary of the $M_{File}$ samples from File. In step 726, method A is invoked with parameters of next-coarser-file and coarser-sample as generated in step 724. This invocation in step 726 will add coarser-sample to next-coarser-file, which is the next level of summarization. Because method A is recursive, the invocation in step 726 may also summarize and shift samples from next-coarser-file to the level beyond next-coarser-file, and so on, until there is room in next-coarser-file for coarser-sample and in the levels beyond for the even coarser summarized samples. Although recursion is well known in the art, this process will be more intuitively illustrated with specific examples below. After the method returns from its invocation of method A in step 726, in step 728 the method removes the oldest samples from File since they have been shifted to the next level of granularity. With storage space in File thus freed up, in step 730 Sample can be added to File, and then the method can return whence it was invoked.

The block diagrams shown in FIGS. 11 and 12 further illustrate summarization with multiple levels of granularity. In FIG. 11, each raw data point is written to a raw data file 520. When the raw file 520 fills up, i.e., becomes equal to its specified maximum size, the oldest data points in the raw file 520 are fed into the Level-1 Summarization Engine 502b. When the configured number of data points are summarized in the Level-1 Summarization Engine 502b into a single summarized data structure and then deleted from the raw file 520, the summarized data structure gets written to the summarized file 522b. When the Level-1 summarized file 522b is full, i.e., equal to its specified maximum size, the oldest summarized data structures in the Level-1 file 522b are fed to the next level Summarization Engine and deleted from the Level-1 file 522b. The process continues until the summarized and re-summarized data structures reach the final, Level-N Summarization Engine 502n. When the Level-N summarized file 522n is full, i.e., equal to its specified maximum size, the oldest data structures from the Level-N file 522n are discarded. The number of summarization levels and the file size of each level are user-specified.

FIG. 12 further illustrates a specific instance of summarization with three levels of granularity. Once again, although FIG. 12 shows three levels of granularity for illustrative purposes, the present invention contemplates any number of levels, as configured by the user. The data collectors 304 provide data to the Agent 302 in a raw format. The Agent 302 writes these raw data points to a High Data Rate FIFO File 510. This file 510 is of the finest granularity. When High Data Rate FIFO File 510 fills up, i.e., becomes equal to its specified maximum size $N_1$, the oldest $M_1$ data points from the file 510 are summarized with the Summarization Method 500 into a single summarized data structure and deleted from the file 510. The summarized data structure is added to a Medium Data Rate FIFO File 512. When the Medium Data Rate FIFO File 512 is full, i.e., is equal to its specified maximum size $N_2$, the oldest $M_2$ data structures from the file 512 are again summarized with the Summarization Method 500 into a single summarized data structure and deleted from the file 512. Again, the newly summarized data structure is placed into Low Data Rate FIFO File 514. This file 514 is of the coarsest granularity. When the Low Data Rate FIFO File 514 is full, i.e., is equal to its specified maximum size $N_3$, the oldest $M_3$ samples are discarded.

Sets of data points may be continually gathered from one or more data collectors 304 on one or more Agents 302 over a period of time and summarized on a continual basis over a period of time. In other words, as new raw data points are continually added to the High Data Rate FIFO File 510, older data points may be summarized and moved to the Medium Data Rate FIFO File 512 and then to the Low Data Rate FIFO File 514 repetitively. Thus, summarization may take place a plurality of times in sequence to generate summarized data structures, coarser summarized data structures, and further coarser summarized data structures. The data points have timestamps as described above, and the data points and summarized data structures are preferably ordered by time of collection. Therefore, at any given point in time, each data file includes a current oldest set of data and a current youngest set of data. The gathering and the summarization may take place on the same computer system, or they make take place on different computer systems.

At each successive summarization level, the data are older than the data at the previous summarization level. With each successive summarization level, the data representing a given time interval are coarser in granularity and preferably take up less disk space than at the previous summarization level. In other words, at each successive summarization level, a single summarized data structure represents a longer period of time than a data point or summarized data structure at the previous summarization level. In the preferred embodiment, therefore, the degree of coarseness of the data increases with the age of the data.

File Format of the Universal Data Repository

Figure 13:
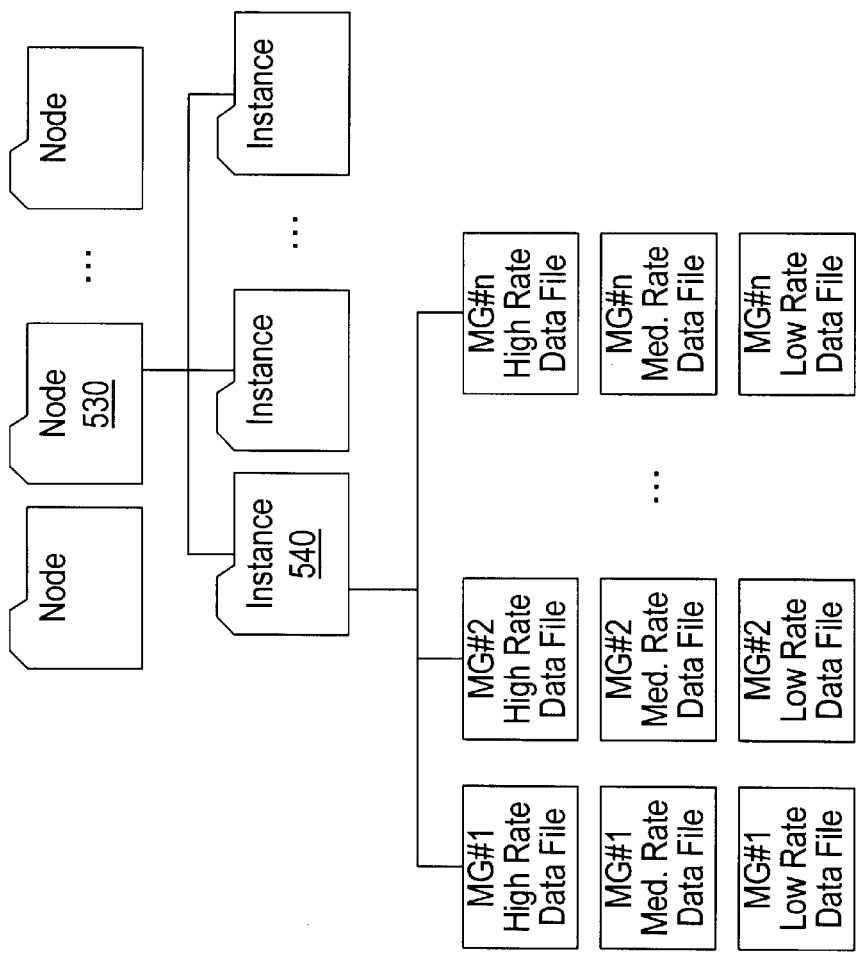
FIG. 13 is a diagram illustrating the high-level file format of UDR.

FIG. 13 illustrates the format of the Universal Data Repository (UDR) in one embodiment. At the top level, UDR comprises one or more nodes 530. Each node represents an agent node 300. Each of the nodes 530 further comprises one or more instances 540. Each of the instances 540 comprises a series of data files for one or more metric groups. For example, as illustrated in FIG. 13, the first instance comprises "n" metric groups (MGs). Each metric group in the first instance is represented by a high rate data file, a medium rate data file, and a low rate data file.

Figure 14:
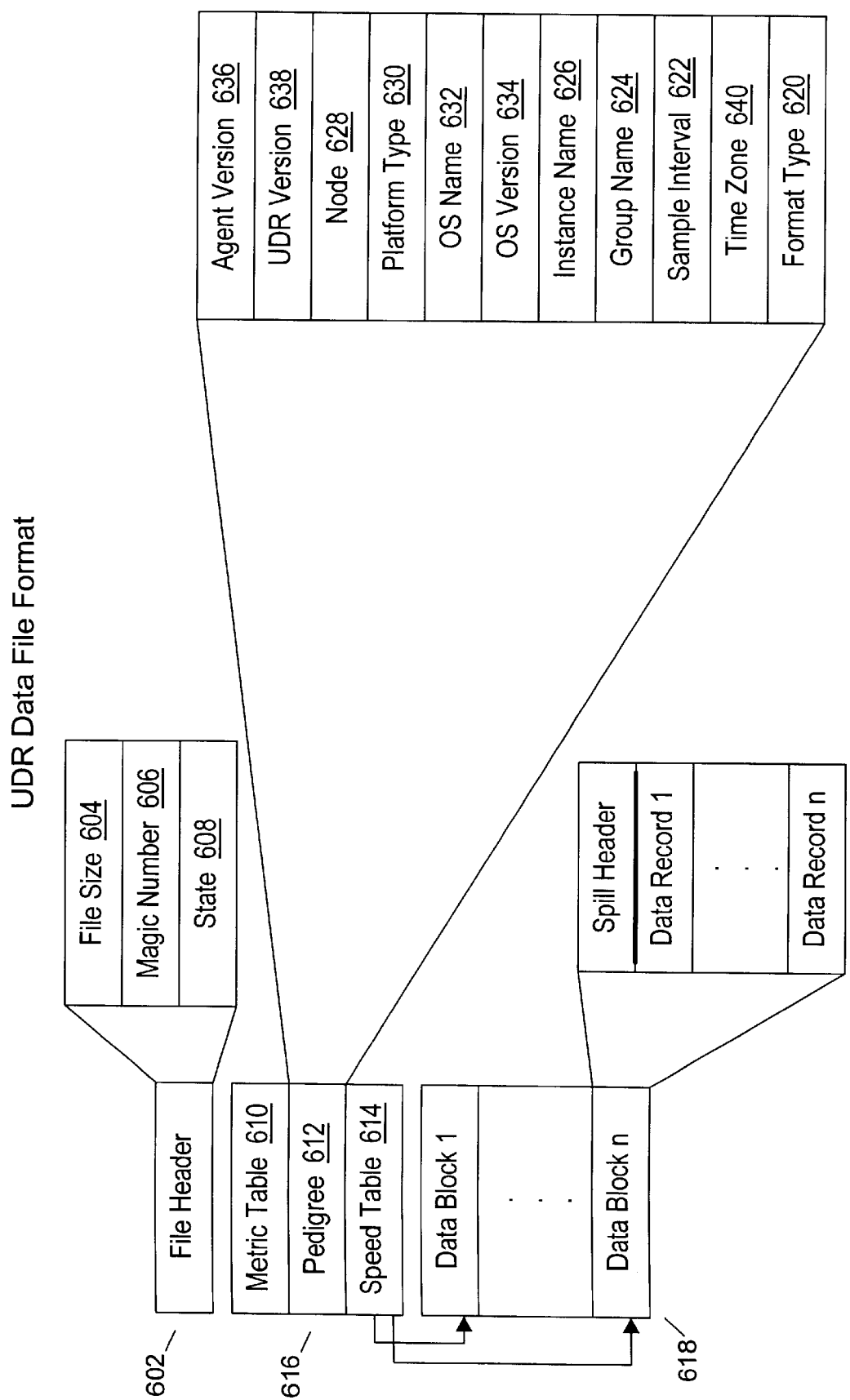
FIG. 14 is a diagram illustrating the data file format of UDR.

FIG. 14 illustrates the format of a UDR data file in one embodiment. A UDR raw data file comprises a file header 602 and a UDR header 616 followed by raw data spills. A UDR summarized data file comprises a file header 602 and a UDR header 616 followed by summarized data spills. As shown, a file header 602 comprises a file size 604, a magic number 606, and a state 608. The magic number 606 is used to validate file type and to determine the byte order of the contents. The byte order indicates whether the contents are big-endian or little-endian, attributes that are well known in the art. The state 608 indicates whether the file was closed properly and could be used to detect a potentially corrupted file. The file size 604 could be used to compare to actual file size to detect an incomplete or corrupted file.

As shown, a UDR header 616 comprises a pedigree 612, a metric table 610, and a speed table 614. The pedigree 612 comprises information that allows an object to describe its origins. The pedigree 612 includes the format type (raw or summarized) 620, the sample interval 622, the metric group name 624, the instance name 626, the identity of the agent node 300 of origin 628, the platform type 630 and operating system name 632 and version 634 of the agent node 300 of origin, the version number 636 of the Agent 302 software on the agent node 300 of origin, the UDR version 638, and the time zone 640 of the agent node 300 of origin. The metric table 610 includes information about the form of the data such as the names of data items, their size, their data type, and their units. The metric table 610 is therefore meta-data that allows an application to present information about the data in an intelligent way. With the pedigree 612 and metric table 610, UDR data files are self-describing. Therefore, the UDR data format is extensible to include data types that are not yet collected by any existing data collectors 304. In other words, because of the flexibility of the UDR data file format, an application written today would be able to read these yet-to-be-created data types.

The speed table 614 is an index into the data blocks 618. The speed table 614 allows the UDR to quickly locate data blocks 618 based on a given time range. Preferably, the data blocks 618 are implemented with a BASEQ. Each data block, i.e., data spill, is a snapshot of an entire metric group for a particular time interval. A raw data block comprises a spill header and a plurality of raw data records. These UDR raw data blocks are in the same format as the raw collect spills which are queued in the Metric Repository 350 and Metric Repository Pool 352. A summarized data block comprises a summarized spill header and a plurality of summarized data records. A summarized data block differs from a raw data block by the format of the records contained.

Figure 15:
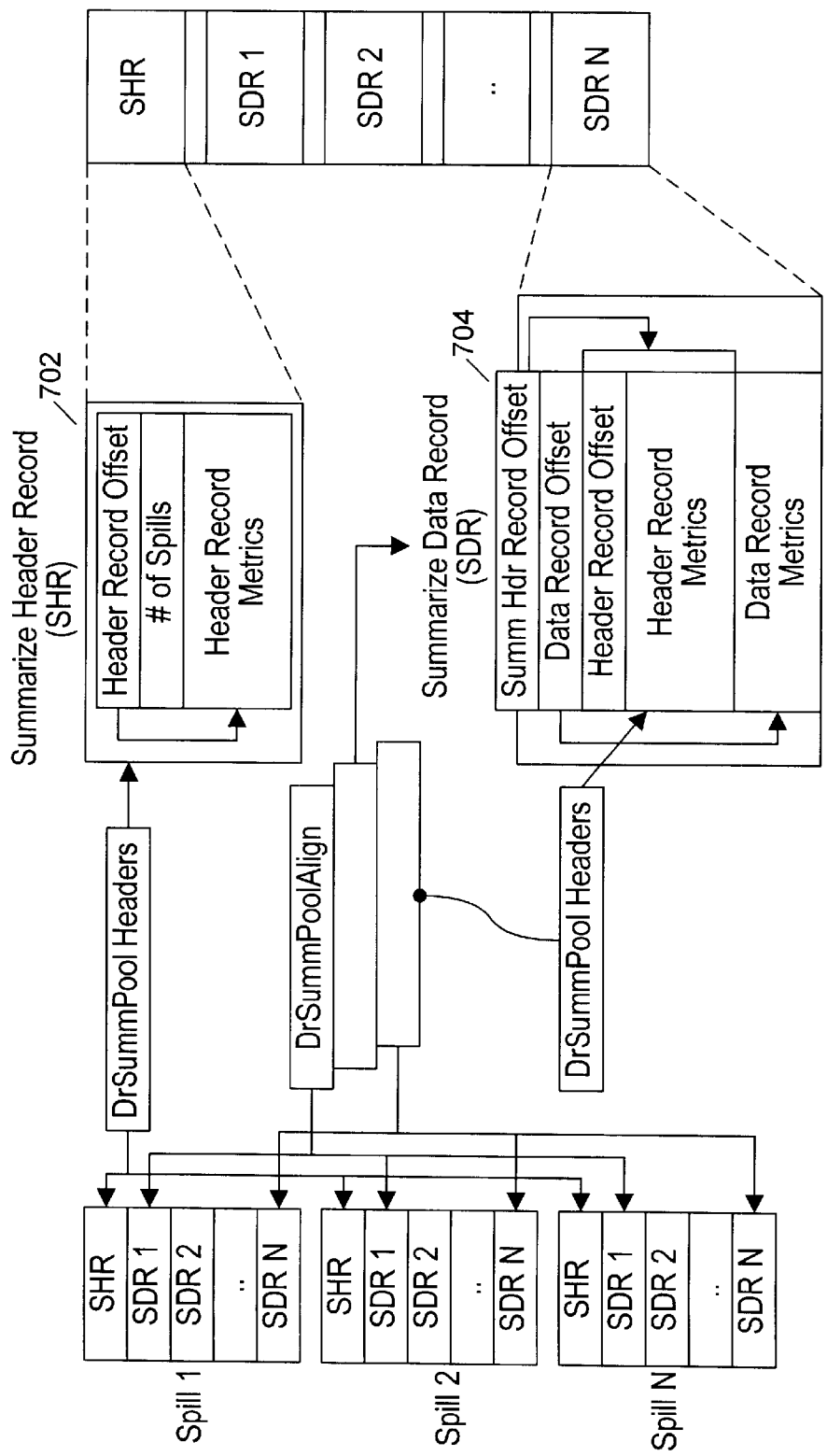
FIG. 15 is a diagram illustrating the structure of data and header records in UDR.

FIG. 15 illustrates the structure of data and header records in UDR in one embodiment. As shown in FIG. 15, a summarized header record 702 comprises a header block and summarized header metrics (as described in the metric description table). The header block comprises a header record offset (a 4-byte integer) and the number of raw spills (a 4-byte integer). The number of raw spills refers to the number of spills that were summarized. The summarized header metrics are each of the header metrics in summarized format.

As shown in FIG. 15, a summarized data record 704 comprises a header block, a summarized header record as described above, and summarized data metrics. The header block, which contains the offsets within the record to the header and data, comprises a record offset for the summarized header record (a 4-byte integer) and a record offset for the summarized data metrics (a 4-byte integer). A data record may not have existed over the entire summarization interval. For example, a process may have started and ended within the interval. For this reason, there needs to be a summarized header record within each summarized data record that will reflect the times the record (process) existed. It is identical in format to the summarized header record for the spill, but will only contain summarized header metrics for those spills that the record existed. The summarized data metrics is each of the data metrics in summarized format.

Figure 16:
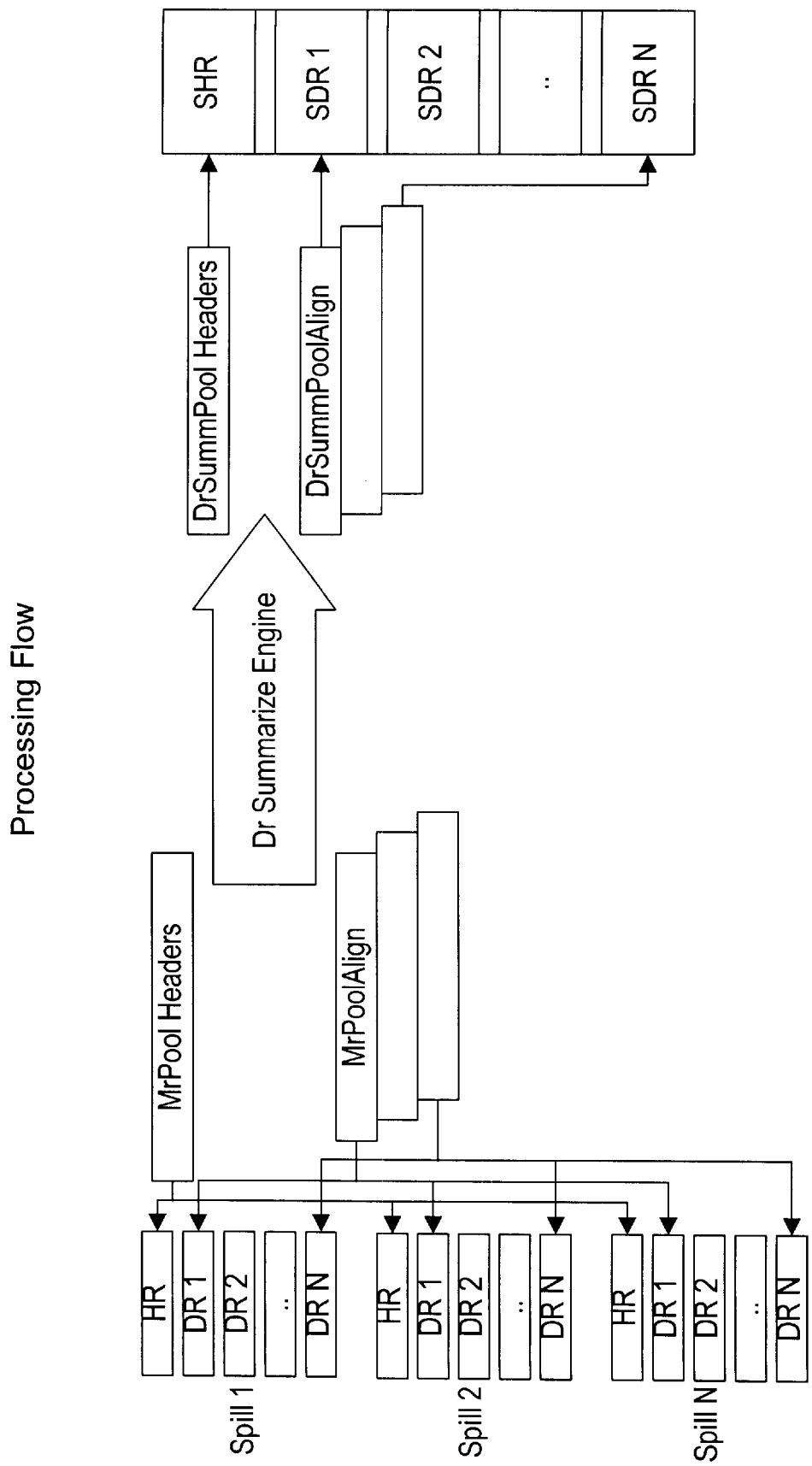
FIG. 16 is a diagram illustrating the processing flow from Metric Repository (Agent) records to Data Repository (UDR) records.

FIG. 16 illustrates the processing flow from Metric Repository (Agent) records to Data Repository (UDR) records in one embodiment.

Although the system and method of the present invention have been described in connection with several embodiments, the invention is not intended to be limited to the specific forms set forth herein, but on the contrary, it is intended to cover such alternatives, modifications, and equivalents, as can be reasonably included within the spirit and scope of the invention as defined by the appended claims.

What is claimed is:

1. A method for storing data regarding one or more computer systems in an enterprise, the method comprising:

receiving a plurality of raw data points, wherein the raw data points comprise measurements of one or more system resources of the one or more computer systems over a period of time;

summarizing the plurality of raw data points, wherein the summarizing comprises creating one or more summarized data structures, wherein each summarized data structure corresponds to at least two of the raw data points;

summarizing a plurality of the summarized data structures, wherein the summarizing the plurality of summarized data structures:

(a) creates one or more coarser summarized data structures, wherein each coarser summarized data structure corresponds to at least two previously summarized data structures;

(b) occurs a plurality of times in sequence as new raw data points are received to create further coarser summarized data structures, wherein a degree of coarseness of the summarized data structures increases with an age of the raw data points summarized in the summarized data structures.

2. The method of claim 1, wherein the summarizing a plurality of the summarized data structures occurs a plurality of times in sequence to create further coarser summarized data structures, wherein a degree of coarseness of the summarized data structures increases with an age of the raw data points summarized in the summarized data structures.

3. The method of claim 1, wherein the receiving a plurality of raw data points includes receiving a plurality of sets of data points over a period of time, wherein the plurality of sets includes a youngest set of the raw data points and an oldest set of the raw data points;

wherein the summarizing the plurality of raw data points further comprises summarizing the oldest set of the raw data points.

4. The method of claim 1, wherein said receiving a plurality of raw data points, said summarizing the plurality of raw data points, and said summarizing a plurality of the summarized data structures are performed respectively for a plurality of sets of raw data points, wherein each summarized data structure corresponds to at least two sets of raw data points;

wherein a degree of coarseness of the summarized data structures increases with an age of the raw data points summarized in the summarized data structures.

5. The method of claim 1, further comprising storing the raw data points in a raw file, wherein the raw data points are stored sequentially in order of collection.

6. The method of claim 5, wherein the summarizing the plurality of raw data points further comprises summarizing an oldest subset of the raw data points stored in the raw file when the raw file reaches a maximum raw file size.

7. The method of claim 6, further comprising deleting from the raw file the oldest subset of the raw data points.

8. The method of claim 1, further comprising storing the summarized data structures in a summarized file, wherein the summarized data structures are stored sequentially in order of collection of corresponding raw data points.

9. The method of claim 8, wherein the summarizing a plurality of summarized data structures further comprises summarizing an oldest subset of the summarized data structures when the summarized file reaches a maxinum summarized file size.

10. The method of claim 9, further comprising deleting from the summarized file the oldest subset of the summarized data structures.

11. The method of claim 1, wherein the raw data points further comprise measurements of one or more processes of the one or more computer systems over the period of time;

wherein the summarizing the plurality of raw data points further comprises determining one or more state changes from the raw data points, wherein the state changes comprise a starting time for each process begun within the period of time and an ending time for each process ended within the period of time;

wherein the summarized data structures include the state changes;

wherein the summarizing a plurality of summarized data structures further comprises determining one or more state changes from the summarized data structures, wherein the state changes comprise a starting time for each process begun within the period of time and an ending time for each process ended within the period of time;

wherein the coarser summarized data structures include the state changes.

12. The method of claim 1, wherein the receiving a plurality of raw data points, the summarizing the plurality of raw data points, and the summarizing a plurality of summarized data structures occur on a single computer system of the one or more computer systems.

13. The method of claim 1, wherein the receiving a plurality of raw data points and the summarizing the plurality of raw data points occur on two or more different computer systems.

14. The method of claim 1, wherein the receiving a plurality of raw data points and the summarizing a plurality of summarized data structures occur on two or more different computer systems.

15. A method for storing data regarding one or more computer systems in an enterprise, the method comprising:

receiving a plurality of sets of raw data points over a period of time, wherein the sets of raw data points comprise measurements of one or more system resources of the one or more computer systems, wherein each set of raw data points has an age, wherein the sets of raw data points are ordered by age, wherein, at any point in time the plurality of sets of raw data points includes a current youngest set of raw data points and a current oldest set of raw data points;

summarizing the raw data points in the current oldest set of raw data points, wherein the summarizing the raw data. points creates one or more summarized data structures, wherein each summarized data structure corresponds to at least two data points of the current oldest set of raw data points;

wherein the summarizing the raw data points occurs a plurality of times for respective sets of raw data points to create a plurality of sets of summarized data structures, wherein each set of summarized data structures has an age, wherein the sets of summarized data structures are ordered by age, wherein, at any point in time, the plurality of sets of summarized data structures includes a current youngest set of summarized data structures and a current oldest set of summarized data structures;

summarizing the summarized data structures in the current oldest set ef summarized data structures, wherein the summarizing the summarized data structures:

(a) creates one or more coarser summarized data structures, wherein each coarser summarized data structure corresponds to at least two summarized data structures of the current oldest set of summarized data structures;

(b) occurs a plurality of times for respective sets of summarized data structures to create a plurality of sets of further coarser summarized data structures, wherein a degree of coarseness of the summarized data structures increases with an age of the raw data points summarized in the summarized data structures.

16. A system for storing data regarding one or more computer systems in an enterprise, the system comprising:
a CPU;
a system memory coupled to the CPU, wherein the system memory stores one or more computer programs executable by the CPU;
wherein the computer programs are executable to:
receive a plurality of raw data points, wherein said raw data points comprise measurements of one or more system resources of the one or more computer systems over a period of time;
summarize the plurality of raw data points, to create one or more summarized data structures, wherein each summarized data structure corresponds to at least two of the raw data points;
summarize a plurality of the summarized data structures, to create one or more coarser summarized data structures, wherein each coarser summarized data structure corresponds to at least two of the previously summarized data structures;
summarize the plurality of the summarized data structures a plurality of times in sequence as new raw data points are received, to create further coarser summarized data structures, wherein a degree of coarseness of the summarized data structure increases with an age of the raw data points summarized in the summarized data structures.

17. The system of claim 16, wherein the computer programs are executable to summarize the plurality of the summarized data structures a plurality of times in sequence to create further coarser summarized data structures, wherein a degree of coarseness of the summarized data structure increases with an age of the raw data points summarized in the summarized data structures.

18. The system of claim 16,
wherein in receiving the plurality of raw data points, the computer programs are executable to receive a plurality of sets of data points over a period of time, wherein the plurality of sets includes a youngest set of the raw data points and an oldest set of the raw data points;
wherein in summarizing the plurality of raw data points, the computer programs are executable to summarize the oldest set of the raw data points.

19. The system of claim 16, wherein the computer programs are executable to receive the plurality of raw data points, summarize the plurality of raw data points, and summarize the plurality of the summarized data structures respectively for a plurality of sets of raw data points, wherein each summarized data structure corresponds to at least two sets of raw data points, wherein a degree of coarseness of the summarized data structures increases with an age of the raw data points summarized in the summarized data structures.

20. The system of claim 16, furher. comprising a nonvolatile memory.

21. The system of claim 20, wherein the nonvolatile memory stores the raw data points in a raw file, wherein the raw data points are stored sequentially in order of collection.

22. The system of claim 21, wherein in summarizing the plurality of raw data points, the computer programs are executable to summarize an oldest subset of the raw data points when the raw file reaches a maximum raw file size.

23. The system of claim 22, wherein the computer programs are executable to delete from the raw file in the nonvolatile memory the oldest subset of the raw data points.

24. The system of claim 20, wherein the nonvolatile memory stores the summarized data structures in a summarized file, wherein the summarized data structures are stored sequentially in order of collection of corresponding raw data points.

25. The system of claim 24, wherein in summarizing the plurality of summarized data structures, the computer programs are executable to summarize an oldest subset of the summarized data structures when the summarized file reaches a maximum summarized file size.

26. The system of claim 25, wherein the computer programs are executable to delete from the summarized file in the nonvolatile memory the oldest subset of the summarized data structures.

27. The system of claim 16,
wherein the raw data points further comprise measurements of one or more processes over the period of time;
wherein the computer programs are executable to determine one or more state changes from the raw data points, wherein the state changes comprise a starting time for each process begun within the period of time and an ending time for each process ended within the period of time;
wherein the summarized data structures include the state changes;
wherein the computer programs are executable to determine one or more state changes from the summarized data structures, wherein the state changes comprise a starting time for each process begun within the period of time and an ending time for each process ended within the period of time;

wherein the coarser summarized data structures include the state changes.

28. A system for storing data regarding one or more computer systems in an enterprise, the system comprising:
a network comprising a plurality of interconnected computer systems, wherein each of the plurality of interconnected computer systems includes one or more system resources;
wherein at least one computer system of the plurality of interconnected computer systems is operable to store a plurality of data points received from the plurality of interconnected computer systems, wherein the plurality of data points comprises a series of measurements of one or more system resources of the plurality of interconnected computer systems over a period of time;
wherein the at least one computer system comprises:
a CPU;
a system memory coupled to the CPU, wherein the system memory stores one or more computer programs executable by the CPU;
wherein the computer programs are executable to:
receive a plurality of raw data points, wherein said raw data points comprise measurements of one or more system resources of the one or more computer systems over a period of time;
summarize the plurality of raw data points, to create one or more summarized data structures, wherein each summarized data structure corresponds to at least two of the raw data points;
summarize a plurality of the summarized data structures, to create one or more coarser summarized data structures, wherein each coarser summarized data structure corresponds to at least two of the previously summarized data structures;
summarize the plurality of the summarized data structures a plurality of times in sequence as new raw data points are received, to create further coarser summarized data structures, wherein a degree of coarseness of the summarized data structure increases with an age of the raw data points summarized in the summarized data structures.

29. The system of claim 28, wherein the computer programs of the at least one computer system are further executable to summarize the plurality of summarized data structures a plurality of times in sequence to create further coarser summarized data structures, wherein a degree of coarseness of the summarized data structure increases with an age of the raw data points summarized in the summarized data structures.

30. The system of claim 28,
wherein in receiving the plurality of raw data points, the computer programs of the at least one computer system are executable to receive a plurality of sets of data points over a period of time, wherein the plurality of sets includes a youngest set of the raw data points and an oldest set of the raw data points;
wherein in summarizing the plurality of raw data points, the computer programs of the at least one computer system are executable to summarize the oldest set of the raw data points.

31. The system of claim 28, wherein the computer programs of the at least one computer system are executable to receive the plurality of raw data points, summarize the plurality of raw data points, and summarize the plurality of the summarized data structures respectively for a plurality of sets of raw data points, wherein each summarized data structure corresponds to at least two sets of raw data points, wherein a degree of coarseness of the summarized data structures increases with an age of the raw data points summarized in the summarized data structures.

32. The system of claim 28, wherein at least one computer system further includes a nonvolatile memory.

33. The system of claim 32, wherein the nonvolatile memory stores the raw data points in a raw file, wherein the raw data points are stored sequentially in order of collection.

34. The system of claim 33, wherein in summarizing the plurality of raw data points, the computer programs are executable to summarize an oldest subset of the raw data points when the raw file reaches a maximum raw file size.

35. The system of claim 34, wherein the computer programs are executable to delete from the raw file in the nonvolatile memory the oldest subset of the raw data points.

36. The system of claim 32, herein the nonvolatile memory stores the summarized data structures in a summarized file, wherein the summarized data structures are stored sequentially in order of collection of corresponding raw data points.

37. The system of claim 36, wherein in summarizing the plurality of summarized data structures, the computer programs are executable to summarize an oldest subset of the summarized data structures when the summarized file reaches a maximum summarized file size.

38. The system of claim 36, wherein the computer programs are executable to delete from the summarized file in the nonvolatile memory the oldest subset of the summarized data structures.

39. The system of claim 28,
wherein the raw data points further comprise measurements of one or more processes over the period of time;
wherein the computer programs are executable to determine one or more state changes from the raw data points, wherein the state changes comprise a starting time for each process begun within the period of time and an ending time for each process ended within the period of time;
wherein the summarized data structures include the state changes;
wherein the computer programs are executable to determine one or more state changes from the summarized data structures, wherein the state changes comprise a starting time for each process begun within the period of time and an ending time for each process ended within the period of time;
wherein the coarser summarized data structures include the state changes.

40. A memory medium which stores program instructions for storing data regarding one or more computer systems in an enterprise, wherein the program instructions are executable to implement:
summarizing a plurality of raw data points, wherein the raw data points comprise measurements of one or more system resources of the one or more computer systems over a period of time, wherein the summarizing comprises creating one or more summarized data structures, wherein each summarized data structure corresponds to at least two of the raw data points;
summarizing a plurality of the summarized data structures, wherein the summarizing the plurality of the summarized data structures:
(a) creates one or more coarser summarized data structures, wherein each coarser summarized data structure corresponds to at least two previously summarized data structures.

(b) occurs a plurality of times in sequence as new raw data points are received to create further coarser summarized data structures, wherein a degree of coarseness of the summarized data structures increases with an age of the raw data points summarized in the summarized data structures.

41. The memory medium of claim 40, wherein the summarizing a plurality of the summarized data structures occurs a plurality of times in sequence to create further coarser summarized data structures, wherein a degree of coarseness of the summarized data structures increases with an age of the raw data points summarized in the summarized data structures.

42. The memory medium of claim 40, wherein a plurality of sets of raw data points are received over a period of time, and wherein the plurality of sets of raw data points includes a youngest set of the raw data points and an oldest set of the raw data points;

wherein the summarizing a plurality of raw data points further comprises summarizing the oldest set of the raw data points.

43. The memory medium of claim 40, wherein the summarizing a plurality of raw data points and the summarizing a plurality of the summarized data structures are performed respectively for a plurality of sets of raw data points, wherein each summarized data structure corresponds to at least two sets of raw data points;

wherein a degree of coarseness of the summarized data structures increases with an age of the raw data points summarized in the summarized data structures.

44. The memory medium of claim 40, wherein the program instructions further implement storing the raw data points in a raw file, wherein the raw data points are stored sequentially in order of collection.

45. The memory medium of claim 44, wherein the summarizing a plurality of raw data points further comprises summarizing an oldest subset of the raw data points stored in the raw file when the raw file reaches a maximum raw file size.

46. The memory medium of claim 45, wherein the program instructions further implement deleting from the raw file the oldest subset of the raw data points.

47. The memory medium of claim 40, wherein the program instructions further implement storing the summarized data structures in a summarized file, wherein the summarized data structures are stored sequentially in order of collection of corresponding raw data points.

48. The memory medium of claim 47, wherein the summarizing a plurality of summarized data structures further comprises summarizing an oldest subset of the summarized data structures when the summarized file reaches a maximum summarized file size.

49. The memory medium of claim 48, wherein the program instructions further implement deleting from the summarized file the oldest subset of the summarized data structures.

50. The memory medium of claim 40, wherein the raw data points further comprise measurements of one or more processes of the one or more computer systems over the period of time;

wherein the summarizing a plurality of raw data points further comprises determining one or more state changes from the raw data points, wherein the state changes comprise a starting time for each process begun within the period of time and an ending time for each process ended within the period of time;

wherein the summarized data structures include the state changes;

wherein the summarizing a plurality of summarized data structures further comprises determining one or more state changes from the summarized data structures, wherein the state changes comprise a starting time for each process begun within the period of time and an ending time for each process ended within the period of time;

wherein the coarser summarized data structures include the state changes.

51. The memory medium of claim 40, wherein the summarizing a plurality of raw data points and the summarizing a plurality of summarized data structures occur on a single computer system of the one or more computer systems.

* * * * *